US012217907B2

(12) United States Patent
Ito et al.

(10) Patent No.: US 12,217,907 B2
(45) Date of Patent: *Feb. 4, 2025

(54) RARE-EARTH MAGNET AND METHOD OF MANUFACTURING THE SAME

(71) Applicants: TOYOTA JIDOSHA KABUSHIKI KAISHA, Toyota (JP); NICHIA CORPORATION, Anan (JP)

(72) Inventors: Masaaki Ito, Anjo (JP); Daisuke Ichigozaki, Toyota (JP); Noritsugu Sakuma, Mishima (JP); Akihito Kinoshita, Mishima (JP); Michiya Kume, Anan (JP); Hisashi Maehara, Itano-gun (JP)

(73) Assignees: TOYOTA JIDOSHA KABUSHIKI KAISHA, Toyota (JP); NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,491

(22) Filed: Dec. 1, 2021

(65) Prior Publication Data

US 2022/0199321 A1 Jun. 23, 2022

(30) Foreign Application Priority Data

Dec. 17, 2020 (JP) ................................ 2020-209452

(51) Int. Cl.
*H01F 41/02* (2006.01)
*B22F 3/16* (2006.01)
(Continued)

(52) U.S. Cl.
CPC ............ *H01F 41/0266* (2013.01); *B22F 3/16* (2013.01); *B22F 3/24* (2013.01); *H01F 1/059* (2013.01);
(Continued)

(58) Field of Classification Search
CPC ........... B22F 3/24; H01F 1/059; H01F 1/0596
See application file for complete search history.

(56) References Cited

U.S. PATENT DOCUMENTS

2010/0261038 A1 10/2010 Imaoka et al.
2017/0186519 A1 6/2017 Maehara
(Continued)

FOREIGN PATENT DOCUMENTS

CN 110942881 A 3/2020
GB 1398588 A 6/1975
(Continued)

OTHER PUBLICATIONS

JP 2020-050892 machine translation (Year: 2020).*
(Continued)

*Primary Examiner* — Paul A Wartalowicz
*Assistant Examiner* — Stephani Hill
(74) *Attorney, Agent, or Firm* — Oliff PLC

(57) ABSTRACT

A rare-earth magnet and a method of manufacturing the same are provided. The method includes: preparing Sm—Fe—N magnetic powder; preparing reforming material powder containing metallic zinc; mixing the magnetic powder and the reforming material powder to obtain mixed powder; subjecting the mixed powder to compression molding in a magnetic field to obtain a magnetic-field molded body; subjecting the magnetic-field molded body to pressure sintering to obtain a sintered body; and subjecting the sintered body to heat treatment. A content proportion of the metallic zinc in the reforming material powder is 10 to 30% by mass with respect to the mixed powder. When a temperature and time in conditions for the heat treatment are defined as x° C. and y hours, respectively, the formulas $y \geq -0.32x+136$ and $350 \leq x \leq 410$ are met.

8 Claims, 5 Drawing Sheets

(51) Int. Cl.
*B22F 3/24* (2006.01)
*H01F 1/059* (2006.01)

(52) U.S. Cl.
CPC ...... *H01F 1/0596* (2013.01); *B22F 2003/248* (2013.01); *B22F 2202/05* (2013.01); *B22F 2301/30* (2013.01); *B22F 2301/355* (2013.01)

(56) References Cited

U.S. PATENT DOCUMENTS

| | | | |
|---|---|---|---|
| 2019/0006068 | A1 | 1/2019 | Sakuma et al. |
| 2019/0311826 | A1 | 10/2019 | Sakuma et al. |
| 2020/0098496 | A1 | 3/2020 | Kinoshita et al. |
| 2021/0272751 | A1 | 9/2021 | Ichigozaki et al. |
| 2021/0304933 | A1 | 9/2021 | Tang et al. |
| 2022/0246336 | A1 | 8/2022 | Ichigozaki et al. |

FOREIGN PATENT DOCUMENTS

| | | | | | |
|---|---|---|---|---|---|
| JP | 04354104 | A | * | 12/1992 | H01F 1/058 |
| JP | H04-368102 | A | | 12/1992 | |
| JP | 06020815 | A | * | 1/1994 | H01F 1/0593 |
| JP | H06-077025 | A | | 3/1994 | |
| JP | H09237708 | A | | 9/1997 | |
| JP | 2001-254168 | A | | 9/2001 | |
| JP | 2002-043110 | A | | 2/2002 | |
| JP | 2003-168602 | A | | 6/2003 | |
| JP | 2015-201628 | A | | 11/2015 | |
| JP | 2017-055072 | A | | 3/2017 | |
| JP | 2017-117937 | A | | 6/2017 | |
| JP | 2019-012796 | A | | 1/2019 | |
| JP | 2019-012811 | A | | 1/2019 | |
| JP | 6455238 | B2 | | 1/2019 | |
| JP | 2019-186368 | A | | 10/2019 | |
| JP | 2020-057644 | A | | 4/2020 | |
| JP | 2020-057645 | A | | 4/2020 | |
| JP | 2020-057646 | A | | 4/2020 | |
| JP | 2020050892 | A | * | 4/2020 | H01F 1/0596 |
| JP | 2020-102606 | A | | 7/2020 | |
| JP | 2020-155545 | A | | 9/2020 | |
| JP | 2020-155740 | A | | 9/2020 | |
| JP | 2020-161704 | A | | 10/2020 | |
| JP | 2021-052111 | A | | 4/2021 | |
| WO | 2015/198396 | A1 | | 12/2015 | |
| WO | 2015/199096 | A1 | | 12/2015 | |

OTHER PUBLICATIONS

Prabhu et al. Enhanced coercivity of spark plasma sintered Zn-bonded Sm—Fe—N magnets. Scripta Materilia 67 (2012) 153-156. (Year: 2012).*
Takagi et al. Fabrication of Zn—Sm2Fe17N3 sintered magnets by high-pressure current sintering. J. Jpn. Soc. Powder Powder Metallurgy vol. 59, No. 9, 564-569. (Year: 2011).*
WO 2015/199096 machine translation (Year: 2015).*
JP H06-020815 machine translation (Year: 1994).*
JP H04-354104 machine translation (Year: 1992).*
U.S. Appl. No. 17/563,134, filed Dec. 28, 2021.
Jan. 11, 2023 Office Action issued in U.S. Appl. No. 17/563,134.
Aug. 16, 2023 Office Action issued in U.S. Appl. No. 17/137,026.
U.S. Appl. No. 17/137,026, filed Dec. 29, 2020, in the name of Daisuke Ichigozaki et al.
Apr. 11, 2023 Office Action issued in U.S. Appl. No. 17/137,026.
Jun. 22, 2023 U.S. Office Action issued U.S. Appl. No. 17/563,134.
May 30, 2024 U.S. Office Action issued in U.S. Appl. No. 17/137,026.
Feb. 23, 2024 Office Action Issued in U.S. Appl. No. 17/137,026.
Sep. 23, 2024 Office Action issued in U.S. Appl. No. 17/986,179.

* cited by examiner

RARE-EARTH MAGNET AND METHOD OF MANUFACTURING THE SAME

CROSS-REFERENCE TO RELATED APPLICATION

This application claims priority to Japanese Patent Application No. 2020-209452 filed on Dec. 17, 2020, incorporated herein by reference in its entirety.

BACKGROUND

1. Technical Field

The present disclosure relates to a rare-earth magnet and a method of manufacturing the same. In particular, the present disclosure relates to a rare-earth magnet including magnetic phases containing Sm, Fe, and N, at least a part of the magnetic phases having a crystal structure of one of a $Th_2Zn_{17}$ type and a $Th_2Ni_{17}$ type, and a method of manufacturing the rare-earth magnet.

2. Description of Related Art

Sm—Co rare-earth magnets and Nd—Fe—B rare-earth magnets have been put into practical use as high-performance rare-earth magnets, and other rare-earth magnets have been studied in recent years.

For example, rare-earth magnets containing Sm, Fe, and N (hereinafter occasionally referred to as "Sm—Fe—N rare-earth magnets") have been studied. The Sm—Fe—N rare-earth magnets are manufactured using magnetic powder containing Sm, Fe, and N (hereinafter occasionally referred to as "SmFeN powder"), for example.

The SmFeN powder includes magnetic phases having a crystal structure of one of a $Th_2Zn_{17}$ type and a $Th_2Ni_{17}$ type. It is considered that, in the magnetic phases, N is interstitially dissolved in Sm—Fe crystals. Therefore, the SmFeN powder is easily decomposed with N detached because of heat. Thus, the Sm—Fe—N rare-earth magnets are often manufactured by molding the SmFeN powder using a resin and/or rubber etc.

The other examples of the method of manufacturing the Sm—Fe—N rare-earth magnet include the manufacturing method disclosed in WO 2015/199096. This manufacturing method includes mixing SmFeN powder and powder containing metallic zinc (hereinafter occasionally referred to as "metallic zinc powder"), molding the mixed powder in a magnetic field, and sintering (including liquid-phase sintering) the magnetic-field molded body.

Examples of the method of manufacturing the SmFeN powder include those disclosed in Japanese Unexamined Patent Application Publication No. 2017-117937 (JP 2017-117937 A) and Japanese Unexamined Patent Application Publication No. 2020-102606 (JP 2020-102606 A).

SUMMARY

The methods of sintering the magnetic-field molded body are roughly divided into a pressureless sintering method and a pressure sintering method. A high-density rare-earth magnet (sintered body) can be obtained by sintering the magnetic-field molded body through either of the two sintering methods. In the pressureless sintering method, no pressure is applied to the magnetic-field molded body that is being sintered, and therefore the magnetic-field molded body is generally sintered at high temperatures of 900° C. or higher for a long time of six hours or more, in order to obtain a high-density sintered body. In the pressure sintering method, on the other hand, a pressure is applied to the magnetic-field molded body that is being sintered, and therefore a high-density sintered body can be generally obtained even when the magnetic-field molded body is sintered at low temperatures of 600 to 800° C. and in a short time of 0.1 to five hours.

When a magnetic-field molded body of the mixed powder of the SmFeN powder and the metallic zinc powder is to be sintered, pressure sintering is adopted in order to avoid decomposition of the SmFeN powder due to heat, and the magnetic-field molded body is sintered at lower temperatures and in a shorter time than normal pressure sintering. The magnetic-field molded body can be sintered at such low temperatures and in such a short time, because zinc components in the metallic zinc powder are diffused on the surface of the magnetic powder during sintering to be sintered (solidified). In this manner, the metallic zinc powder in the magnetic-field molded body has a function as a binder. In addition, the metallic zinc powder in the magnetic-field molded body also has a function as a reforming material that reforms αFe phases in the SmFeN powder and absorbs oxygen in the SmFeN powder to improve the coercive force. Hereinafter, powder that is used to manufacture Sm—Fe—N rare-earth magnets and that has both the function as a binder and the function as a reforming material will be occasionally referred to simply as "reforming material powder".

When a permanent magnet such as an Sm—Fe—N rare-earth magnet is used in a motor, the permanent magnet is disposed in an external magnetic field environment that is varied periodically. Therefore, the permanent magnet is demagnetized by an increase in the external magnetic field. This will be described with reference to drawings.

FIG. 1 schematically illustrates magnetization-magnetic field curves (M-H curves) for permanent magnets. The solid line indicates a magnetization-magnetic field curve for a permanent magnet that has a high orientation degree. The dashed line indicates a magnetization-magnetic field curve for a permanent magnet that has a reduced orientation degree.

A permanent magnet in a motor is used in an external magnetic field environment in the range indicated as the "motor operation region" in FIG. 1. Therefore, when magnetization is fluctuated significantly in the motor operation region, as with the permanent magnet indicated by the dashed line in FIG. 1, current control of the motor on the stator side is complicated, which increases the load on an inverter connected to the motor. Then, an inverter with a high capacity is needed, which is not economical.

When the orientation degree is reduced, the recoil permeability is reduced, and magnetization is reduced on the portion of the motor operation region where the absolute value of the external magnetic field is larger. As a result, the output (torque) of the motor is reduced. The magnetic phases having a crystal structure of the $Th_2Zn_{17}$ type and/or the $Th_2Ni_{17}$ type, which develop magnetization of the Sm—Fe—N rare-earth magnets, have a large anisotropic magnetic field, and therefore are not easily oriented.

To improve magnetization of a permanent magnet, it is effective to improve the volume rate of magnetic phases that develop magnetization. To that end, it is effective to improve the density of the permanent magnet. When the permanent magnet is obtained by molding magnetic powder, it is effective to sinter the magnetic powder in order to improve the density of the permanent magnet. To obtain a sintered body of the SmFeN powder, however, pressure sintering is performed at lower temperatures and in a shorter time than normal pressure sintering, in order to avoid decomposition of the SmFeN powder due to heat. In order to achieve pressure sintering at low temperatures and in a short time, reforming material powder that has both the function as a binder and the function as a reforming material, such as metallic zinc powder, is used as discussed above. When such reforming material powder is used, magnetization is reduced accordingly. Thus, when the orientation degree of the sintered body (Sm—Fe—N rare-earth magnet) is reduced, magnetization is reduced further significantly on the portion of the "motor operation region" in FIG. 1 where the absolute value of the external magnetic field is larger (left side in FIG. 1).

Thus, the present inventors have conceived of preparing an Sm—Fe—N rare-earth magnet that provides an improved orientation degree while suppressing a reduction in magnetization due to the use of reforming material powder.

The present disclosure provides an Sm—Fe—N rare-earth magnet that provides an improved orientation degree while suppressing a reduction in magnetization due to the use of reforming material powder, and provides a method of manufacturing the Sm—Fe—N rare-earth magnet.

The present inventors made diligent studies, and completed the rare-earth magnet according to the present disclosure and the method of manufacturing the same. The rare-earth magnet according to the present disclosure and the method of manufacturing the same include the following aspects.

<1> A first aspect of the present disclosure is directed to a method of manufacturing a rare-earth magnet, including: preparing magnetic powder including magnetic phases containing Sm, Fe, and N, at least a part of the magnetic phases having a crystal structure of one of a $Th_2Zn_{17}$ type and a $Th_2Ni_{17}$ type; preparing reforming material powder containing metallic zinc; mixing the magnetic powder and the reforming material powder to obtain mixed powder; subjecting the mixed powder to compression molding in a magnetic field to obtain a magnetic-field molded body; subjecting the magnetic-field molded body to pressure sintering to obtain a sintered body; and subjecting the sintered body to heat treatment, in which: a content proportion of the metallic zinc in the reforming material powder is 10 to 30% by mass with respect to the mixed powder; and when a temperature and time in conditions for the heat treatment are defined as x° C. and y hours, respectively, the following formulas are met: $y \geq -0.32x+136$; and $350 \leq x \leq 410$.

<2> x may meet $350 \leq x \leq 400$.

<3> y may meet $y \leq 40$.

<4> The magnetic-field molded body may be subjected to pressure sintering for one to 30 minutes at pressures of 1000 to 1500 MPa and at temperatures of 300 to 400° C.

<5> A proportion of magnetic particles having particle diameters of 1.0 μm or less in the magnetic powder may be 1 to 20% with respect to all the magnetic particles in the magnetic powder.

<6> A second aspect of the present disclosure is directed to a rare-earth magnet including magnetic phases containing Sm, Fe, and N, at least a part of the magnetic phases having a crystal structure of one of a $Th_2Zn_{17}$ type and a $Th_2Ni_{17}$ type, in which: the rare-earth magnet contains 10 to 30% by mass of zinc components, and the magnetic phases and the zinc components shape crystal phase particles; and a proportion of the crystal phase particles having particle diameters of 1.0 μm or less is 10.00% or less with respect to the total number of the crystal phase particles.

With the present disclosure, it is possible to provide an Sm—Fe—N rare-earth magnet that provides an improved orientation degree while suppressing a reduction in magnetization due to the use of reforming material powder, by the rare-earth magnet containing a predetermined range of zinc components that derive from the reforming material and a predetermined proportion or less of fine crystal phases. In addition, it is possible to provide a method of manufacturing the Sm—Fe—N rare-earth magnet that provides an improved orientation degree while suppressing a reduction in magnetization due to the use of reforming material powder, by compounding a predetermined range of the reforming material powder and subjecting the sintered body obtained through pressure sintering to heat treatment at a low temperature and in a short time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a rare-earth magnet and a method of manufacturing the same according to the present disclosure will be described in detail below. The following embodiment does not limit the rare-earth magnet and the method of manufacturing the same according to the present disclosure.

To impart orientation to a sintered body of mixed powder of SmFeN powder and reforming material powder, a magnetic-field molded body obtained by subjecting the mixed powder to compression molding in a magnetic field is subjected to pressure sintering. The reason that the orientation degree of the sintered body is improved at this time by the method of manufacturing the rare-earth magnet according to the present disclosure will be described with reference to the drawings.

Figure 1:
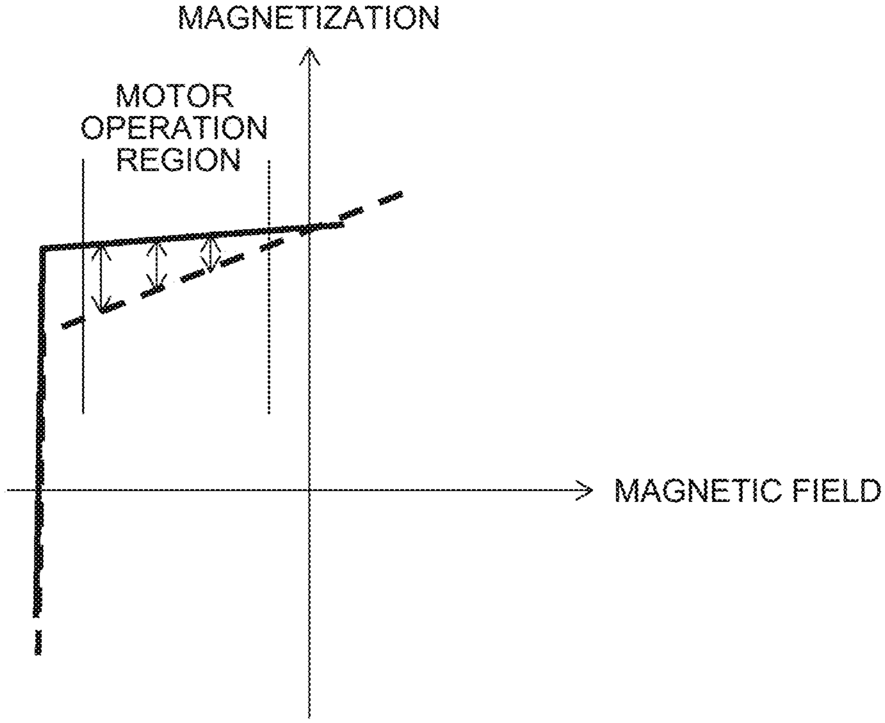
FIG. 1 schematically illustrates magnetization-magnetic field curves (M-H curves) for permanent magnets.
Figure 2:
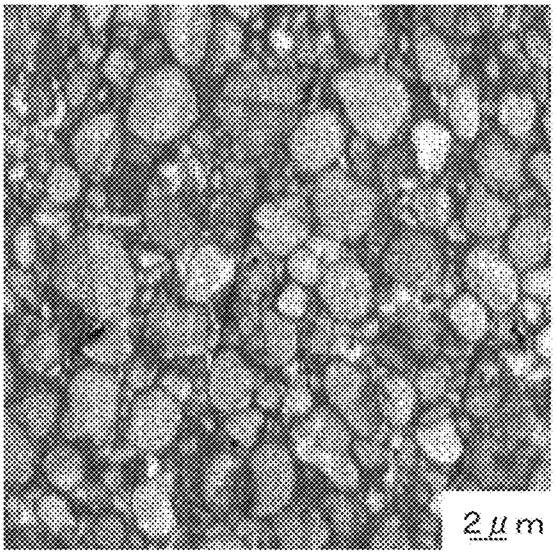
FIG. 2 illustrates a scanning electron microscope image of SmFeN powder.
Figure 3:
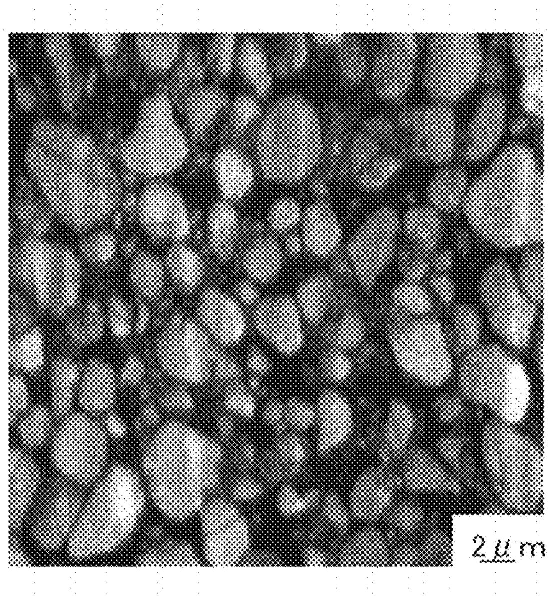
FIG. 3 illustrates a scanning electron microscope image of a sintered body of mixed powder of SmFeN powder and reforming material powder that has been obtained by a method of manufacturing a rare-earth magnet according to the present disclosure.

FIG. 2 illustrates a scanning electron microscope image of SmFeN powder. FIG. 3 illustrates a scanning electron microscope image of a sintered body of mixed powder of SmFeN powder and reforming material powder that has been is obtained by a method of manufacturing a rare-earth magnet according to the present disclosure.

The scanning electron microscope image illustrated in FIG. 2 is an unclear image that is coarse as a whole. Thus, it can be understood that the SmFeN powder contains fine particles. On the other hand, the scanning electron microscope image illustrated in FIG. 3 is clear as a whole, and contains very few fine organizations (fine crystal phases) that derive from the fine particles in the SmFeN powder. In the sintered body (rare-earth magnet according to the present disclosure) having the organizations illustrated in FIG. 3, a reduction in magnetization due to the use of reforming material powder has been suppressed, and the orientation degree has been improved. Without being bound by theory, the present inventors consider the reason that such a rare-earth magnet is obtained as follows.

It is generally difficult to orient fine particles, even when such particles are subjected to compression molding in a magnetic field. In addition, magnetic phases in the SmFeN powder have a very high anisotropic magnetic field, and therefore require a strong magnetic field to be oriented. For these reasons, it is difficult to orient the fine particles, even when such particles are subjected to compression molding in a strong magnetic field, although particles with relatively large particle diameters (particles other than the fine particles) are oriented. Herein, the orientation degree that indicates the degree of orientation is defined as (magnetization in an external magnetic field of 1000 kA/m)/(magnetization in an external magnetic field of 6000 kA) unless specifically stated otherwise.

When a magnetic-field molded body, which is obtained by subjecting mixed powder of reforming material powder and SmFeN powder containing fine particles to compression molding, is subjected to pressure sintering, and magnetic phases that derive from fine particles remain as they are, the orientation degree of the resulting sintered body is significantly reduced. This is because the magnetic phases that derive from the fine particles cancel out a part of strong magnetization caused by particles with relatively large particle diameters being oriented magnetically, since the magnetic phases that derive from the fine particles are directed magnetically irregularly when the sintered body is magnetized. In other words, when the magnetic phases are oriented, strong magnetization is caused by magnetization of the sintered body. However, when the magnetic phases that derive from the fine particles are directed magnetically irregularly, not only magnetization is accordingly reduced but also a part of the strong magnetization caused by the oriented magnetic phases is canceled out.

In order to reduce the adverse effects caused by the fine particles discussed above, it is conceivable to subject mixed powder from which the fine particles in the SmFeN powder have been removed to pressure sintering. However, the fine particles are often electrostatically charged, and it often takes a lot of person-hours to remove the fine particles.

The present inventors have found that the magnetic phases in the fine particles can be turned into non-magnetic phases to reduce the adverse effects caused by the fine particles, by causing the fine particles and the reforming material powder in the mixed powder to moderately react with each other. The present inventors have also found that, to that end, a predetermined range of reforming material powder may be compounded and a sintered body obtained through pressure sintering may be subjected to heat treatment at low temperatures and in a short time. It is considered that, in the thus obtained sintered body after heat treatment (rare-earth magnet according to the present disclosure), most of crystal phases (non-magnetic phases) that derive from the fine particles have been integrated with reforming phases (non-magnetic phases) that cover the surface of particles with relatively large particle diameters (particles other than the fine particles). Therefore, the present inventors have found that the rare-earth magnet according to the present disclosure with an improved orientation degree contains very few fine crystal phases (non-magnetic phases) that derive from the fine particles. The reforming phases will be discussed in detail later.

Constituent elements of the rare-earth magnet according to the present disclosure and the method of manufacturing the same, which have been completed based on the findings etc. that have been discussed so far, will be described below.

Method of Manufacturing Rare-Earth Magnet

The method of manufacturing a rare-earth magnet according to the present disclosure (hereinafter occasionally referred to simply as a "manufacturing method according to the present disclosure") includes a magnetic powder preparation process, a reforming material powder preparation process, a mixing process, a magnetic-field formation process, a pressure sintering process, and a heat treatment process. Each of the processes will be described below.

Magnetic Powder Preparation Process

Magnetic powder (SmFeN powder) is prepared. The magnetic powder (SmFeN powder) that is used in the manufacturing method according to the present disclosure is not specifically limited as long as the powder includes magnetic phases containing Sm, Fe, and N, at least a part of the magnetic phases having a crystal structure of one of a $Th_2Zn_{17}$ type and a $Th_2Ni_{17}$ type. Besides the structures discussed above, the magnetic phases may have a crystal structure of a $TbCu_7$ type, for example. Sm denotes samarium, Fe denotes iron, and N denotes nitrogen. In addition, Th denotes thorium, Zn denotes zinc, Ni denotes nickel, Tb denotes terbium, and Cu denotes copper.

The SmFeN powder may contain magnetic phases represented by a composition formula $(Sm_{(1-i)}R_i)_2(Fe_{(1-j)}Co_j)_{17}N_h$, for example. The rare-earth magnet (hereinafter occasionally referred to as a "product") obtained by the manufacturing method according to the present disclosure develops magnetization that derives from the magnetic phases in the SmFeN powder. Symbols i, j, and h indicate molar ratios.

The magnetic phases in the SmFeN powder may contain R in such a range that the effects of the manufacturing method according to the present disclosure and the magnetic properties of the product are not adversely affected. This range is represented by i in the above composition formula. i may be 0 or more, 0.10 or more, or 0.20 or more, and may be 0.50 or less, 0.40 or less, or 0.30 or less, for example. R is one or more selected from rare-earth elements other than Sm and Y and Zr. Herein, the rare-earth elements include Sc, La, Ce, Pr, Nd, Pm, Sm, Eu, Gd, Tb, Dy, Ho, Er, Tm, Yb, and Lu. Y denotes yttrium, Zr denotes zirconium, Sc denotes scandium, La denotes lanthanum, Ce denotes cerium, Pr denotes praseodymium, Nd denotes neodymium, Pm denotes promethium, Sm denotes samarium, Eu denotes europium, Gd denotes gadolinium, Tb denotes terbium, Dy denotes dysprosium, Ho denotes holmium, Er denotes erbium, Tm denotes thulium, Yb denotes ytterbium, and Lu denotes lutetium.

While $(Sm_{(1-i)}R_i)_2(Fe_{(1-j)}Co_j)_{17}N_h$ is typically obtained by substituting R for Sm in $Sm_2(Fe_{(1-j)}Co_j)_{17}N_h$, the present disclosure is not limited thereto. For example, a part of R may be interstitially disposed in $Sm_2(Fe_{(1-j)}Co_j)_{17}N_h$.

The magnetic phases in the SmFeN powder may contain Co in such a range that the effects of the manufacturing method according to the present disclosure and the magnetic properties of the product are not adversely affected. This range is represented by j in the above composition formula. j may be 0 or more, 0.10 or more, or 0.20 or more, and may be 0.52 or less, 0.40 or less, or 0.30 or less, for example.

While $(Sm_{(1-i)}R_i)_2(Fe_{(1-j)}Co_j)_{17}N_h$ is typically obtained by substituting Co for Fe in $(Sm_{(1-i)}R_i)_2Fe_{17}N_h$, the present disclosure is not limited thereto. For example, a part of Co may be interstitially disposed in $(Sm_{(1-i)}R_i)_2Fe_{17}N_h$.

The magnetic phases in the SmFeN powder contain N that is interstitially present in crystal particles represented by $(Sm_{(1-i)}R_i)_2(Fe_{(1-j)}Co_j)_{17}$, which contributes to the development and the improvement of magnetic properties.

While h in $(Sm_{(1-i)}R_i)_2(Fe_{(1-j)}Co_j)_{17}N_h$ may be 1.5 to 4.5, $(Sm_{(1-i)}R_i)_2(Fe_{(1-j)}Co_j)_{17}N_h$ is typically $(Sm_{(1-i)}R_i)_2(Fe_{(1-j)}Co_j)_{17}N_3$. h may be 1.8 or more, 2.0 or more, or 2.5 or more, and may be 4.2 or less, 4.0 or less, or 3.5 or less. The content of $(Sm_{(1-i)}R_i)_2(Fe_{(1-j)}Co_j)_{17}N_3$ in the whole $(Sm_{(1-i)}R_i)_2(Fe_{(1-j)}Co_j)_{17}N_h$ is preferably 70% by mass or more, more preferably 80% by mass or more, and still more preferably 90% by mass. On the other hand, all of $(Sm_{(1-i)}R_i)_2(Fe_{(1-j)}Co_j)_{17}N_h$ may not be $(Sm_{(1-i)}R_i)_2(Fe_{(1-j)}Co_j)_{17}N_3$. The content of $(Sm_{(1-i)}R_i)_2(Fe_{(1-j)}Co_j)_{17}N_3$ in the whole $(Sm_{(1-i)}R_i)_2(Fe_{(1-j)}Co_j)_{17}N_h$ may be 98% by mass or less, 95% by mass or less, or 92% by mass or less.

The SmFeN powder may contain, besides the magnetic phases represented by $(Sm_{(1-i)}R_i)_2(Fe_{(1-j)}Co_j)_{17}N_h$, oxygen and $M^1$ and unavoidable impurity elements in such a range that the effects of the manufacturing method according to the present disclosure and the magnetic properties of the product are not substantially adversely affected. From the viewpoint of securing the magnetic properties of the product, the content of the magnetic phases represented by $(Sm_{(1-i)}R_i)_2(Fe_{(1-j)}Co_j)_{17}N_h$ in the whole SmFeN powder may be 80% by mass or more, 85% by mass or more, or 90% by mass or more. On the other hand, there is practically no problem when the content of the magnetic phases represented by $(Sm_{(1-i)}R_i)_2(Fe_{(1-j)}Co_j)_{17}N_h$ in the whole SmFeN powder is not significantly high. Thus, the content may be 97% by mass or less, 95% by mass or less, or 93% by mass or less. The remainder of the magnetic phases represented by $(Sm_{(1-i)}R_i)_2(Fe_{(1-j)}Co_j)_{17}N_h$ corresponds to the content of oxygen and $M^1$. A part of oxygen and $M^1$ may be interstitially and/or substitutionally present in the magnetic phases.

$M^1$ mentioned above may be one or more selected from Ga, Ti, Cr, Zn, Mn, V, Mo, W, Si, Re, Cu, Al, Ca, B, Ni, and C. The unavoidable impurity elements are such impurity elements that are inevitably contained during manufacture etc. of a raw material and/or magnetic powder, or that cannot be avoided without incurring a significant increase in the manufacturing cost. Such elements may be interstitially and/or substitutionally present in the magnetic phases discussed above, or may be present in phases other than the magnetic phases discussed above. Alternatively, the unavoidable impurity elements may be present at the grain boundary between such phases. Ga denotes gallium, Ti denotes titanium, Cr denotes chromium, Zn denotes zinc, Mn denotes manganese, V denotes vanadium, Mo denotes molybdenum, W denotes tungsten, Si denotes silicon, Re denotes rhenium, Cu denotes copper, Al denotes aluminum, Ca denotes calcium, B denotes boron, Ni denotes nickel, and C denotes carbon.

The particle diameter $D_{50}$ of the SmFeN powder is not specifically limited as long as the product has desired magnetic properties. The $D_{50}$ may be 1.00 μm or more, 2.00 μm or more, 3.00 μm or more, 3.08 μm or more, 4.00 μm or more, 5.00 μm or more, 6.00 μm or more, 7.00 μm or more, 8.00 μm or more, or 9.00 μm or more, and may be 20.00 μm or less, 19.00 μm or less, 18.00 μm or less, 17.00 μm or less, 16.00 μm or less, 15.00 μm or less, 14.00 μm or less, 13.00 μm or less, 12.00 μm or less, 11.00 μm or less, or 10.00 μm or less, for example. The $D_{50}$ means median size.

The $D_{50}$ of the SmFeN powder is calculated from the particle size distribution of the SmFeN powder. The particle size distribution of the SmFeN powder is measured (examined) by the following method. Herein, the indication of the particle size (particle diameter) of the SmFeN powder is based on the following measurement method (examination method) unless specifically stated otherwise.

Figure 4:
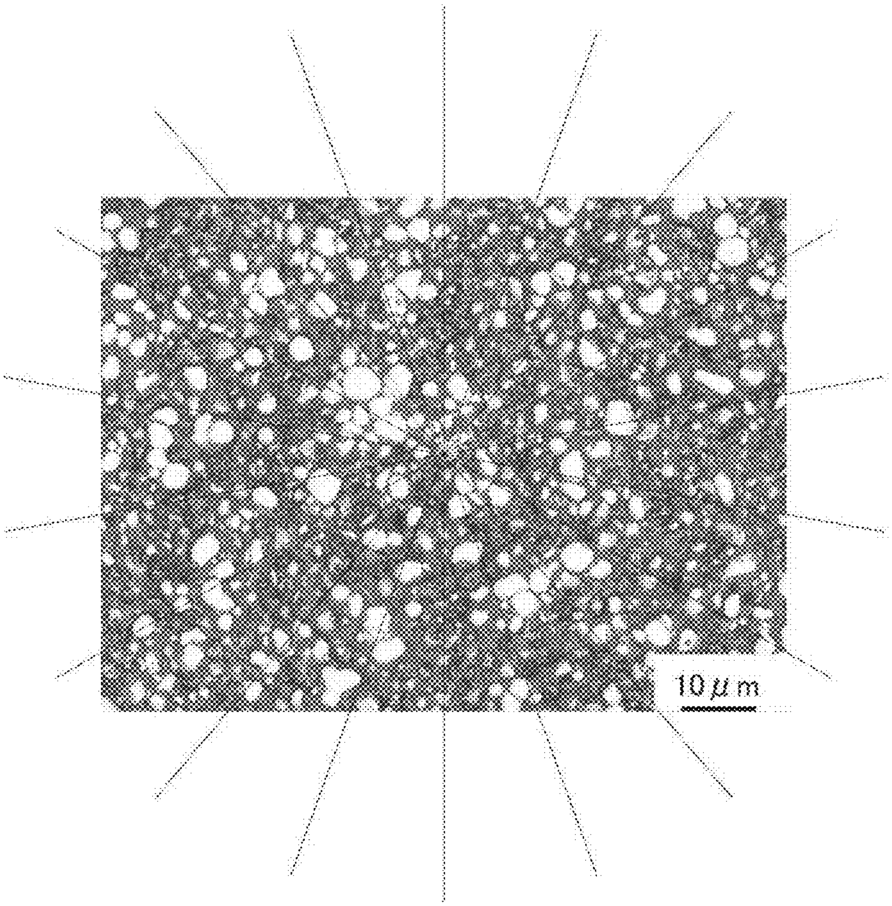
FIG. 4 illustrates an optical microscope image of a sample obtained by filling SmFeN powder with a resin.

A sample obtained by filling the SmFeN powder with a resin is prepared, and the surface of the sample is polished and observed using an optical microscope. FIG. 4 illustrates an optical microscope image of the sample obtained by filling the SmFeN powder with a resin. In FIG. 4, the bright field indicates particles of the SmFeN powder, and the dark field indicates the resin.

As illustrated in FIG. 4, lines are drawn on the optical microscope image, the lengths of line segments obtained by sectioning the lines with the SmFeN particles (bright field) are measured, and the particle size distribution of the SmFeN powder is calculated from the frequency distribution of the lengths of the line segments. The particle size distribution calculated by this method is substantially equal to the particle size distribution calculated by the linear intercept method.

The SmFeN powder contains fine particles because of the convenience of manufacture etc. Since the adverse effects caused by the fine particles can be reduced by the manufacturing method according to the present disclosure, however, the proportion of magnetic particles (fine particles) having particle diameters of 1.0 μm or less in the SmFeN powder is not specifically limited. The proportion of magnetic particles (fine particles) having particle diameters of 1.0 μm or less in the SmFeN powder may be 1.0% or more, 3.0% or more, 5.0% or more, 7.0% or more, or 10.0% or more, and may be 20.0% or less, 18.0% or less, 16.0% or less, 14.0% or less, 13.4% or less, or 12.0% or less, with respect to all the magnetic particles in the SmFeN powder.

In the manufacturing method according to the present disclosure, reforming material powder to be discussed later is mixed in the SmFeN powder. Oxygen in the SmFeN powder is absorbed by metallic zinc or zinc alloy powder in the reforming material powder, which improves the magnetic properties, particularly the coercive force, of the product. The content of oxygen in the SmFeN powder may be determined in consideration of the amount of oxygen in the SmFeN powder to be absorbed by the reforming material powder in the manufacturing process. The content of oxygen in the SmFeN powder is preferably small with respect to the whole SmFeN powder. The content of oxygen in the SmFeN powder is preferably 2.0% by mass or less, more preferably 1.5% by mass or less, and still more preferably 1.0% by mass or less, with respect to the whole SmFeN powder. On the other hand, significantly reducing the content of oxygen in the SmFeN powder incurs an increase in the manufacturing cost. Thus, the content of oxygen in the SmFeN powder may be 0.1% by mass or more, 0.2% by mass or more, or 0.3% by mass or more with respect to the whole SmFeN powder.

The method of manufacturing the SmFeN powder is not specifically limited as long as the description above is satisfied, and commercially available SmFeN powder may be used. Examples of the method of manufacturing the SmFeN powder include a method including manufacturing Sm—Fe powder from a samarium oxide and iron powder through a reduction-diffusion method and subjecting the Sm—Fe powder to heat treatment at 600° C. or lower in an atmosphere of a mixed gas of nitrogen and hydrogen, a nitrogen gas, an ammonia gas, etc. Other examples include a method including manufacturing an Sm—Fe alloy through a dissolution method, nitriding coarsely pulverized particles obtained by coarsely pulverizing the alloy, and further pulverizing the particles to desired particle diameters. The pulverizing may be performed using a dry jet mill, a dry ball mill, a wet ball mill, a wet bead mill, etc., for example. These may be used in combination.

Besides the manufacturing methods discussed above, the SmFeN powder can be obtained by a manufacturing method including a pre-treatment process of subjecting an oxide containing Sm and Fe to heat treatment in an atmosphere containing a reducing gas to obtain a partial oxide, a process of subjecting the partial oxide to heat treatment in the presence of a reducing agent to obtain alloy particles, and subjecting the alloy particles to heat treatment at a first temperature of 400° C. or higher and 470° C. or lower, and thereafter to heat treatment at a second temperature of 480° C. or higher and 610° C. or lower, in an atmosphere containing nitrogen or ammonia to obtain a nitride, for example. For alloy particles with large particle diameters, e.g. alloy particles containing La, in particular, nitriding occasionally does not fully progress to the inside of oxide particles. When nitriding is performed at the temperatures of the two stages, however, the inside of the oxide particles is fully nitrided, and anisotropic SmFeN powder with narrow particle size distribution and high remanent magnetization can be obtained.

Pre-Treatment Process

The oxide containing Sm and Fe that is used in the pre-treatment process may be fabricated by mixing an Sm oxide and an Fe oxide, for example. However, the oxide is preferably manufactured through a process (precipitation process) of mixing a solution containing Sm and Fe and a precipitant to obtain a precipitate containing Sm and Fe and a process (oxidation process) of sintering the precipitate to obtain an oxide containing Sm and Fe.

Precipitation Process

In the precipitation process, an Sm raw material and an Fe raw material are dissolved in a strongly acid solution to prepare a solution containing Sm and Fe. When $Sm_2Fe_{17}N_3$ is obtained as the main phase, the molar ratio of Sm and Fe (Sm:Fe) is preferably 1.5:17 to 3.0:17, more preferably 2.0:17 to 2.5:17. Raw materials such as La, W, Co, Ti, Sc, Y, Pr, Nd, Pm, Gd, Tb, Dy, Ho, Er, Tm, and Lu may be added to the solution discussed above. The solution preferably contains La from the viewpoint of residual flux density. The solution preferably contains W from the viewpoint of coercive force and squareness ratio. The solution preferably contains Co and Ti from the viewpoint of temperature properties.

The Sm raw material and the Fe raw material are not limited as long as the raw materials can be dissolved in the strongly acidic solution. The Sm raw material may be samarium oxide, and the Fe raw material may be $FeSO_4$, from the viewpoint of availability, for example. The concentration of the solution containing Sm and Fe can be adjusted, as appropriate, in the range in which the Sm raw material and the Fe raw material are substantially dissolved in the acid solution. The acid solution may be sulfuric acid etc. from the viewpoint of solubility.

The solution containing Sm and Fe and a precipitant are caused to react with each other to obtain an insoluble precipitate containing Sm and Fe. The solution containing Sm and Fe may be a solution containing Sm and Fe when the solution is caused to react with the precipitant. For example, the raw materials including Sm and Fe may be prepared as separate solutions, and the solutions may be dropped to react with the precipitant. Also when the raw materials are prepared as separate solutions, the raw materials are prepared, as appropriate, in the range in which the raw materials are substantially dissolved in the acid solution. The precipitant is not limited as long as the precipitant is an alkaline solution that reacts with the solution containing Sm and Fe to derive a precipitate. The precipitant may be ammonia water, caustic soda, etc., and is preferably caustic soda.

The precipitation reaction is preferably caused by a method in which the solution containing Sm and Fe and the precipitant are dropped into a solvent such as water, since the properties of particles of the precipitate can be adjusted easily. A precipitate with uniform distribution of constituent elements, narrow particle size distribution, and refined powder shape can be obtained by controlling, as appropriate, the rate of supply of the solution containing Sm and Fe and the precipitant, the reaction temperature, the reaction solution concentration, pH during reaction, etc. Use of such a precipitate improves the magnetic properties of the SmFeN powder as the final product. The reaction temperature may be 0° C. or higher and 50° C. or lower, and is preferably 35° C. or higher and 45° C. or lower. The reaction solution concentration is preferably 0.65 mol/L or more and 0.85 mol/L or less, more preferably 0.7 mol/L or more and 0.85 mol/L or less, in terms of the total concentration of metal ions. The reaction pH is preferably 5 or more and 9 or less, more preferably 6.5 or more and 8 or less.

The solution containing Sm and Fe preferably further contains one or more metals selected from the group consisting of La, W, Co, and Ti from the viewpoint of magnetic properties. The solution preferably contains La from the viewpoint of residual flux density, preferably contains W from the viewpoint of coercive force, and preferably contains Co and Ti from the viewpoint of temperature properties, for example. The La raw material is not limited as long as the raw material can be dissolved in the strongly acid solution, and may be $La_2O_3$, $LaCl_3$, etc. from the viewpoint of availability, for example. The La raw material, the W raw material, the Co raw material, and the Ti raw material are adjusted, as appropriate, in the range in which the raw materials are substantially dissolved in the acid solution together with the Sm raw material and the Fe raw material. The acid solution may be sulfur acid from the viewpoint of solubility. The W raw material may be ammonium tungstate. The Co raw material may be cobalt sulfate. The titanium raw material may be sulfated titania.

When the solution containing Sm and Fe further contains one or more metals selected from the group consisting of La, W, Co, and Ti, an insoluble precipitate containing Sm, Fe, and one or more selected from the group consisting of La, W, Co, and Ti is obtained. The solution may contain one or more selected from the group consisting of La, W, Co, and Ti when the solution is caused to react with the precipitant. For example, the raw materials may be prepared as separate solutions and the solutions may be dropped to react with the precipitant, or the raw materials may be prepared together with the solution containing Sm and Fe.

The powder particle diameter, the powder shape, and the particle size distribution of the finally obtained SmFeN powder are roughly determined based on the powder obtained through the precipitation process. When the particle diameter of the obtained powder is measured using a wet laser-diffraction particle size distribution analyzer, the powder preferably has such a size and distribution that substantially all the powder is in the range of 0.05 μm or more and 20 μm or less, preferably 0.1 μm or more and 10 μm or less.

After the precipitate is separated, the separated matter is preferably removed from the solvent, in order to suppress a possibility that the precipitate is dissolved again in the remaining solvent in the heat treatment of the following oxidation process, and the precipitate is agglomerated when the solvent is evaporated, or the particle size distribution, the powder particle diameter, etc. are varied. When water is used as the solvent, for example, the specific method of removing the separated matter from the solvent may be a method in which the separated matter is dried in an oven at 70° C. or higher and 200° C. or lower for a period of five hours or more and 12 hours or less.

The precipitation process may be followed by processes of separating and washing the obtained precipitate. The washing process is performed, as appropriate, until the conductivity of the supernatant solution becomes 5 mS/$m^2$ or less. The process of separating the precipitate may include adding a solvent (preferably water) to the obtained precipitate, mixing the mixture, and thereafter performing a filtration method, a decantation method, etc., for example.

Oxidation Process

In the oxidation process, the precipitate obtained through the precipitation process is sintered to obtain an oxide containing Sm and Fe. The precipitate can be turned into an oxide through heat treatment, for example. When the precipitate is subjected to heat treatment, the heat treatment needs to be performed in the presence of oxygen, and the heat treatment can be performed in the atmosphere, for example. Since the heat treatment needs to be performed in the presence of oxygen, the non-metal portion of the precipitate preferably contains oxygen atoms.

The heat-treatment temperature (hereinafter "oxidation temperature") in the oxidation process is not specifically limited, but is preferably 700° C. or higher and 1300° C. or lower, more preferably 900° C. or higher and 1200° C. or lower. Oxidation may not be sufficient at temperatures lower than 700° C. The targeted shape, average particle diameter, and particle size distribution of the SmFeN powder may not be obtained at temperatures higher than 1300° C. The heat-treatment time is also not specifically limited, but is preferably one hour or more and three hours or less.

The obtained oxide is oxide particles in which Sm and iron are sufficiently mixed microscopically and that reflect the shape, particle size distribution, etc. of the precipitate.

Pre-Treatment Process

In the pre-treatment process, the oxide containing Sm and Fe discussed above is subjected to heat treatment in an atmosphere containing a reducing gas to obtain a partial oxide in which a part of the oxide has been reduced.

The partial oxide is an oxide, a part of which has been reduced. The oxygen concentration of the partial oxide is not specifically limited, but is preferably 10% by mass or less, more preferably 8% by mass or less. When the oxygen concentration is more than 10% by mass, significant heat is produced from reduction with Ca in the reduction process, which tends to raise the sintering temperature and result in particles that have grown abnormally. The oxygen concentration of the partial oxide can be measured by the non-dispersive infrared absorption method (ND-IR).

The reducing gas is selected, as appropriate, from hydrogen ($H_2$), carbon monoxide (CO), hydrocarbon gases such as methane ($CH_4$), etc. The reducing gas is preferably a hydrogen gas from the viewpoint of cost. The flow rate of the gas is adjusted, as appropriate, in the range in which the oxide is not scattered. The heat-treatment temperature (hereinafter "pre-treatment temperature") in the pre-treatment process is preferably 300° C. or higher and 950° C. or lower, with the lower limit being more preferably 400° C. or higher, still more preferably 750° C. or higher. The upper limit is more preferably lower than 900° C. When the pre-treatment temperature is 300° C. or higher, reduction of the oxide containing Sm and Fe progresses efficiently. When the pre-treatment temperature is 950° C. or lower, meanwhile, particle growth and segregation of oxide particles are suppressed, which makes it possible to maintain desired particle diameters. The heat-treatment time is not specifically limited, and may be one hour or more and 50 hours or less. When hydrogen is used as the reducing gas, the thickness of the oxide layer being used is preferably adjusted to 20 mm or less, and the dew point in the reactor is preferably adjusted to −10° C. or lower.

Reduction Process

In the reduction process, the partial oxide is subjected to heat treatment in the presence of a reducing agent to obtain alloy particles. For example, the partial oxide is brought into contact with molten calcium or calcium vapor to be reduced. The heat-treatment temperature is preferably 920° C. or higher and 1200° C. or lower, more preferably 950° C. or higher and 1150° C. or lower, and still more preferably 980° C. or higher and 1100° C. or lower, from the viewpoint of magnetic properties.

Metallic calcium as the reducing agent is used in the form of particles or powder, and the particle diameter thereof is preferably 10 mm or less. Consequently, it is possible to effectively suppress agglomeration during the reduction reaction. The metallic calcium is preferably added in the proportion of 1.1 to 3.0 times, more preferably 1.5 to 2.5 times, of the reaction equivalent (that is the stoichiometric amount required to reduce the rare-earth oxide, and includes an amount required to reduce the oxide when the Fe component is in the form of an oxide).

In the reduction process, a disintegration promoter may be used, as necessary, together with the metallic calcium as the reducing agent. The disintegration promoter is used, as appropriate, to promote disintegration and granulation of the product in the washing process to be discussed later, and may be an alkaline earth metal salt such as calcium chloride, an alkaline earth oxide such as calcium oxide, etc., for example. The disintegration promoter is used in the proportion of 1% by mass or more and 30% by mass or less, preferably 5% by mass or more and 30% by mass or less, per samarium oxide.

Nitriding Process

In the nitriding process, the alloy particles obtained through the reduction process are subjected to nitriding treatment, in which the alloy particles are subjected to heat treatment at a first temperature of 400° C. or higher and 470° C. or lower, and thereafter to heat treatment at a second temperature of 480° C. or higher and 610° C. or lower, in an atmosphere containing nitrogen or ammonia, to obtain anisotropic magnetic particles. Since the particulate precipitate obtained through the precipitation process discussed above is used, porous agglomerated alloy particles are obtained through the reduction process. Consequently, the alloy particles can be subjected to heat treatment in a nitrogen atmosphere to be nitrided immediately without being subjected to a pulverizing process, which allows the alloy particles to be nitrided uniformly. When the alloy particles are subjected to heat treatment at the second temperature that is a high temperature without being nitrided at the first temperature, nitriding may progress abruptly to cause abnormal heat generation, which may decompose SmFeN and significantly reduce magnetic properties. In addition, the atmosphere during the nitriding process is preferably an atmosphere substantially containing nitrogen because the progress of the nitriding can be slowed down. The word "substantially" is used here in consideration of inevitable inclusion of elements other than nitrogen due to mixing of impurities etc. The proportion of nitrogen in the atmosphere is 95% or more, preferably 97% or more, and more preferably 99% or more, for example.

The first temperature in the nitriding process is 400° C. or higher and 470° C. or lower, preferably 410° C. or higher and 450° C. or lower. When the first temperature is lower than 400° C., the progress of the nitriding is very slow. When the first temperature is higher than 470° C., overnitriding or decomposition may likely be caused by heat generation. The heat-treatment time at the first temperature is not specifically limited, but is preferably one hour or more and 40 hours or less, more preferably 20 hours or less. When the heat-treatment time is less than one hour, the nitriding may not progress sufficiently. When the heat-treatment time is more than 40 hours, the productivity is reduced.

The second temperature is 480° C. or higher and 610° C. or lower, preferably 500° C. or higher and 550° C. or lower. When the second temperature is lower than 480° C., the nitriding may not progress sufficiently in a case where the particles are large. When the second temperature is higher than 610° C., overnitriding or decomposition may likely be caused. The heat-treatment time at the second temperature is preferably 15 minutes or more and five hours or less, more preferably 30 minutes or more and two hours or less. When the heat-treatment time is less than 15 minutes, the nitriding may not progress sufficiently. When the heat-treatment time is more than five hours, the productivity is reduced.

The heat treatment at the first temperature and the heat treatment at the second temperature may be performed consecutively. The heat treatment at the first temperature and the heat treatment at the second temperature are preferably performed consecutively from the viewpoint of productivity, although heat treatment at a temperature lower than the second temperature may be performed during the heat treatment performed consecutively.

Post-Treatment Process

The product obtained after the nitriding process contains CaO generated as a by-product, unreacted metallic calcium, etc., in addition to the magnetic particles, which are occasionally in the state of combined sintered agglomerates. The CaO and the metallic calcium can be separated as calcium hydroxide ($Ca(OH)_2$) suspended matter by putting the product obtained after the nitriding process into cooling water. The remaining calcium hydroxide may be fully removed by washing the magnetic powder with acetic acid etc. When the product is put into water, disintegration of the reaction product in the state of combined sintered agglomerates, that is, micronization, progresses because of oxidation of the metallic calcium with water and hydration of the CaO as a by-product.

Alkaline Treatment Process

The product obtained after the nitriding process may be put into an alkaline solution. The alkaline solution that is used in the alkaline treatment process may be an aqueous solution of calcium hydroxide, an aqueous solution of sodium hydroxide, an aqueous solution of ammonia, etc., for example. Among these, an aqueous solution of calcium hydroxide and an aqueous solution of sodium hydroxide are preferable from the viewpoint of drainage process and high pH. An Sm rich layer containing some oxygen remains as a result of performing the alkaline treatment on the product, and functions as a protective layer, which suppresses an increase in the oxygen concentration due to the alkaline treatment.

The pH of the alkaline solution that is used in the alkaline treatment process is not specifically limited, but is preferably nine or more, more preferably 10 or more. When the pH is less than nine, the rate of reaction to derive calcium hydroxide is high, much heat is generated, and therefore the oxygen concentration of the finally obtained SmFeN powder tends to be high.

The water content in the SmFeN powder obtained after treatment with the alkaline solution in the alkaline treatment process can be reduced, as necessary, by a method such as decantation.

Acid Treatment Process

The alkaline treatment process may be followed by an acid treatment process in which treatment with acid is further performed. In the acid treatment process, at least a part of the Sm rich layer discussed above is removed to reduce the oxygen concentration in the whole SmFeN powder. In the manufacturing method according to the embodiment of the present disclosure, pulverizing etc. is not performed, so that the SmFeN powder has a small average particle diameter and narrow particle size distribution, and fine powder produced by pulverizing etc. is not included. Therefore, it is possible to suppress an increase in the oxygen concentration.

The acid that is used in the acid treatment process is not specifically limited, and may be hydrogen chloride, nitric acid, sulfuric acid, acetic acid, etc., for example. Among these, hydrogen chloride and nitric acid are preferable from the viewpoint that no impurities remain.

The amount of acid used in the acid treatment process is preferably 3.5 parts by mass or more and 13.5 parts by mass or less, more preferably 4 parts by mass or more and 10 parts by mass or less, with respect to 100 parts by mass of the SmFeN powder. When the amount is less than 3.5 parts by mass, oxide on the surface of the SmFeN powder remains to increase the oxygen concentration. When the amount is more than 13.5 parts by mass, reoxidation is likely to occur upon exposure to the atmosphere, and the SmFeN powder is dissolved, which tends to increase the cost. When the amount of acid is 3.5 parts by mass or more and 13.5 parts by mass or less with respect to 100 parts by mass of the SmFeN powder, an Sm rich layer oxidized to such a degree that reoxidation is not likely to occur upon exposure to the atmosphere after the acid treatment can be provided to cover the surface of the SmFeN powder. Thus, SmFeN powder with a low oxygen concentration, a small average particle diameter, and narrow particle size distribution can be obtained.

The water content in the SmFeN powder obtained after treatment with acid in the acid treatment process can be reduced, as necessary, by a method such as decantation.

Dehydration Process

The acid treatment process is preferably followed by a dehydration process. In the dehydration process, a water content in a solid content before vacuum drying can be reduced to suppress the progress of oxidation during drying due to the solid content before vacuum drying containing a high water content. The dehydration process means a process of applying a pressure or a centrifugal force to the solid content before the dehydration process to reduce the value of a water content contained in the solid content after the dehydration process, and does not include simple decantation, filtration, or drying. The method of the dehydration process is not specifically limited, and may be expression, centrifugal separation, etc.

The water content contained in the SmFeN powder after the dehydration process is not specifically limited, but is preferably 13% by mass or less, more preferably 10% by mass or less, from the viewpoint of suppressing the progress of oxidation.

The SmFeN powder obtained through the acid treatment or the SmFeN powder obtained through the dehydration process that is performed after the acid treatment is preferably vacuum-dried. The drying temperature is not specifically limited, but is preferably 70° C. or higher, more preferably 75° C. or higher. The drying time is also not specifically limited, but is preferably one hour or more, more preferably three hours or more.

Reforming Material Powder Preparation Process

Reforming material powder is prepared. The reforming material powder that is used in the manufacturing method according to the present disclosure contains metallic zinc. The metallic zinc means zinc that has not been alloyed. The metallic zinc in the reforming material powder not only bonds and reforms particles of the SmFeN powder, but also reduces the adverse effects caused by fine particles in the SmFeN powder on the magnetic orientation. Without being bound by theory, Fe in the SmFeN powder and the metallic zinc form Fe—Zn alloy phases mainly in the heat treatment process to be discussed later. Ideally, the purity of the metallic zinc is 100% by mass. Practically, however, the purity of the metallic zinc may be 95.0% by mass or more, 96% by mass or more, or 97.0% by mass or more, and may be 99.9% by mass or less, 99.5% by mass or less, 99.0% by mass or less, 98.5% by mass or less, or 98.0% by mass or less, for example.

Fe—Zn alloy phases are formed on the surface of particles of the SmFeN powder with relatively large particle diameters (particles other than the fine particles). The surface of particles of the SmFeN powder includes portions with an imperfect crystal structure such as a $Th_2Zn_{17}$ type and/or a $Th_2Ni_{17}$ type, and α-Fe phases are present at such portions, which causes a reduction in the coercive force. The α-Fe phases form Fe—Zn alloy phases together with the metallic zinc, which suppresses the reduction in the coercive force. That is, the Fe—Zn alloy phases act as reforming phases. Fe and Zn are diffused in each other between particles of the SmFeN powder and particles of the reforming material powder to form Fe—Zn alloy phases. Therefore, particles of the SmFeN powder and particles of the reforming material powder can be strongly bonded to each other. That is, the reforming material powder functions as a binder.

On the other hand, it is considered that Fe—Zn alloy phases are formed for substantially the entire fine particles of the SmFeN powder. This is because it is considered that the fine particles include a large proportion of portions with an imperfect crystal structure such as a $Th_2Zn_{17}$ type and/or a $Th_2Ni_{17}$ type. Most of the Fe—Zn alloy phases that derive from the fine particles are integrated with the Fe—Zn alloy phases formed on the particles with relatively large particle diameters (particles other than the fine particles). Therefore, it is considered that, while fine particles are present in the SmFeN powder as illustrated in FIG. 2, substantially no fine Fe—Zn alloy phases that derive from the fine particles are found in the sintered body as illustrated in FIG. 3.

When the content proportion of metallic zinc in the reforming material powder is 10% by mass or more with respect to the mixed powder, substantially the entire periphery of the surface of particles with relatively large particle diameters (particles other than the fine particles) is covered with the metallic zinc, and uniform Fe—Zn alloy phases are formed, which improves the coercive force. That is, uniform Fe—Zn alloy phases as reforming phases are formed in a film shape on the surface of particles with relatively large particle diameters (particles other than the fine particles). When the content proportion of metallic zinc in the reforming material powder is 10% by mass or more with respect to the mixed powder, in addition, the metallic zinc is also spread on the surface of the fine particles, which promotes reduction of the adverse effects caused by the fine particles. From this point of view, the content proportion of metallic zinc in the reforming material powder may be 12% by mass or more, 14% by mass or more, 16% by mass or more, 18% by mass or more, or 20% by mass or more with respect to the mixed powder.

When the content proportion of metallic zinc in the reforming material powder is 30% by mass or less with respect to the mixed powder, on the other hand, a reduction in magnetization due to the use of the reforming material powder can be suppressed. From this point of view, the content proportion of metallic zinc in the reforming material powder may be 28% by mass or less, 26% by mass or less, 24% by mass or less, or 22% by mass or less with respect to the mixed powder.

The reforming material powder may optionally contain, besides metallic zinc, metal and/or an alloy that has a binder function, a reforming function, and/or other functions as long as the effects of the present disclosure are not impaired. Examples of the other functions include a function of improving corrosion resistance.

Typical examples of the metal and/or alloy other than metallic zinc include a zinc alloy. When the zinc alloy is represented by $Zn\text{-}M^2$, $M^2$ may be selected as an element that is to be alloyed with Zn (zinc) and that lowers the melting start temperature of the zinc alloy to be lower than the melting point of Zn and unavoidable impurity elements. This improves sintering properties in the pressure sintering process to be discussed later. $M^2$ that lowers the melting start temperature of the zinc alloy to be lower than the melting point of Zn may be an element that forms a eutectic alloy with Zn. Typical examples of such $M^2$ include Sn, Mg, Al, and a combination of these. Sn denotes tin, Mg denotes magnesium, and Al denotes aluminum. Elements that do not adversely affect the melting point lowering effect of these elements or the characteristics of the product can also be selected as $M^2$. The unavoidable impurity elements are such impurity elements that are inevitably contained, such as impurities contained in a raw material of the reforming material powder, or that cannot be avoided without incurring a significant increase in the manufacturing cost.

The proportion (molar ratio) of Zn and $M^2$ in the zinc alloy denoted by Zn-$M^2$ may be determined, as appropriate, such that the sintering temperature is adequate. The proportion (molar ratio) of $M^2$ with respect to the whole zinc alloy may be 0.05 or more, 0.10 or more, or 0.20 or more, and may be 0.90 or less, 0.80 or less, 0.70 or less, 0.60 or less, 0.50 or less, 0.40 or less, or 0.30 or less, for example.

The particle diameter of the reforming material powder is not specifically limited, but is preferably smaller than the particle diameter of the SmFeN powder. This allows particles of the reforming material powder to be easily spread among particles of the SmFeN powder. The particle diameter of the reforming material powder may be 0.1 μm or more, 0.5 μm or more, 1 μm or more, or 2 μm or more, and may be 12 μm or less, 11 μm or less, 10 μm or less, 9 μm or less, 8 μm or less, 7 μm or less, 6 μm or less, 5 μm or less, or 4 μm or less, in terms of $D_{50}$ (median size), for example. The particle diameter $D_{50}$ (median size) of the reforming material powder is measured by a dry laser diffraction/scattering method, for example.

When the content of oxygen in the reforming material powder is low, much oxygen in the SmFeN powder can be preferably absorbed. From this point of view, the content of oxygen in the reforming material powder is preferably 5.0% by mass or less, more preferably 3.0% by mass or less, and still more preferably 1.0% by mass or less, with respect to the whole reforming material powder. On the other hand, significantly reducing the content of oxygen in the reforming material powder incurs an increase in the manufacturing cost. Thus, the content of oxygen in the reforming material powder may be 0.1% by mass or more, 0.2% by mass or more, or 0.3% by mass or more with respect to the whole reforming material powder.

Mixing Process

The SmFeN powder and the reforming material powder are mixed to obtain mixed powder. The mixing method is not specifically limited. The mixing method may be methods in which a mortar, a muller wheel mixer, an agitator mixer, a mechanofusion, a V-shaped mixer, a ball mill, etc. is used. Such methods may be used in combination. The V-shaped mixer is a device that includes a container in which two tubular containers are coupled in a V-shape and that is rotated, so that powder in the container is repeatedly gathered and separated by the gravity and the centrifugal force to be mixed.

Magnetic-Field Molding Process

The mixed powder is subjected to compression molding in a magnetic field to obtain a magnetic-field molded body. Consequently, it is possible to impart orientation to the magnetic-field molded body, and to impart anisotropy to the product (rare-earth magnet) to improve remanent magnetization.

The magnetic-field molding method may be a known method such as a method of subjecting mixed powder to compression molding using a molding die around which a magnetic field generation device is installed. The molding pressure may be 10 MPa or higher, 20 MPa or higher, 30 MPa or higher, 50 MPa or higher, 100 MPa or higher, or 150 MPa or higher, and may be 1500 MPa or lower, 1000 MPa or lower, or 500 MPa or lower. The magnitude of the applied magnetic field may be 500 kA/m or more, 1000 kA/m or more, 1500 kA/m or more, or 1600 kA/m or more, and may be 20000 kA/m or less, 15000 kA/m or less, 10000 kA/m or less, 5000 kA/m or less, 3000 kA/m or less, or 2000 kA/m or less. The method of applying a magnetic field may be a method of applying a static magnetic field using an electromagnet, a method of applying a pulse magnetic field using an alternating current, etc.

Pressure Sintering Process

The magnetic-field molded body is subjected to pressure sintering to obtain a sintered body. The method of the pressure sintering is not specifically limited, and a known method can be used. Examples of the pressure sintering method include a method including preparing a die that has a cavity and a punch that is slidable in the cavity, inserting a magnetic-field molded body into the cavity, and sintering the magnetic-field molded body while applying a pressure to the magnetic-field molded body using the punch.

Pressure sintering conditions may be selected, as appropriate, such that the magnetic-field molded body can be sintered (hereinafter occasionally referred to as "subjected to pressure sintering") while applying a pressure to the magnetic-field molded body.

When the sintering temperature is 300° C. or higher, Fe on the surface of particles of the SmFeN powder and metallic zinc in the reforming material powder are slightly diffused in each other in the magnetic-field molded body, which contributes to sintering. From this point of view, the sintering temperature may be 310° C. or higher, 320° C. or higher, 340° C. or higher, or 350° C. or higher, for example. When the sintering temperature is 400° C. or lower, on the other hand, Fe on the surface of particles of the SmFeN powder and metallic zinc in the reforming material powder are not excessively diffused in each other, which does not hinder the heat treatment process to be discussed later or does not adversely affect the magnetic properties of the obtained sintered body. From this point of view, the sintering temperature may be 390° C. or lower, 380° C. or lower, 370° C. or lower, or 360° C. or lower.

For the sintering pressure, a sintering pressure that can enhance the density of the sintered body may be selected as appropriate. Typically, the sintering pressure may be 100 MPa or higher, 200 MPa or higher, 400 MPa or higher, 600 MPa or higher, 800 MPa or higher, or 1000 MPa or higher, and may be 2000 MPa or lower, 1800 MPa or lower, 1600 MPa or lower, 1500 MPa or lower, 1300 MPa or lower, or 1200 MPa or lower.

The sintering time may be determined, as appropriate, such that Fe on the surface of particles of the SmFeN powder and metallic zinc in the reforming material powder are slightly diffused in each other. The sintering time does not include the temperature rise time until the heat treatment temperature is reached. The sintering time may be one minute or more, two minutes or more, or three minutes or more, and may be 30 minutes or less, 20 minutes or less, 10 minutes or less, or five minutes or less, for example.

When the sintering time has elapsed, the sintered body is cooled to finish sintering. Oxidation of the sintered body etc. can be suppressed better as the cooling rate is higher. The cooling rate may be 0.5 to 200° C./second, for example.

The sintering atmosphere is preferably an inert gas atmosphere in order to suppress oxidation of the magnetic-field molded body and the sintered body. The inert gas atmosphere includes a nitrogen gas atmosphere.

Heat Treatment Process

The sintered body is subjected to heat treatment. Consequently, Fe—Zn alloy phases are formed in a film shape on the surface of particles of the SmFeN powder with relatively large particle diameters (particles other than the fine particles), so that particles of the SmFeN powder and particles of the reforming material powder are bonded to each other further strongly (hereinafter occasionally referred to as "solidified" or "solidification"), and reformation is promoted at the same time. In addition, Fe—Zn alloy phases are formed for substantially the entire fine particles of the SmFeN powder, and most of the Fe—Zn alloy phases are integrated with the Fe—Zn alloy phases formed in a film shape on the particles with relatively large particle diameters (particles other than the fine particles). Consequently, it is possible to reduce the adverse effects caused by the fine particles of the SmFeN powder that are present in the magnetic-field molded body on the orientation degree of the sintered body (Sm—Fe—N rare-earth magnet according to the present disclosure) after heat treatment.

When the temperature and the time in conditions for heat treatment are defined as x° C. and y hours, respectively, solidification and reformation can be achieved, and the adverse effects caused by the fine particles can be reduced, when the following formulas (1) and (2) are met.

$$y \geq -0.32x+136 \quad (1)$$

$$350 \leq x \leq 410 \quad (2)$$

When the heat-treatment temperature x° C. is 350° C. or higher, Fe—Zn alloy phases are appropriately formed on the surface of particles with relatively large particle diameters (particles other than the fine particles) and for substantially the entire fine particles, and solidification and reformation can be achieved and the adverse effects caused by the fine particles can be reduced. From this point of view, the heat-treatment temperature may be 360° C. or higher, 370° C. or higher, or 380° C. or higher.

When the heat-treatment temperature x (° C.) is 410° C. or lower, on the other hand, Fe and Zn are not excessively diffused in each other on the surface of particles with relatively large particle diameters (particles other than the fine particles) and for the fine particles. However, a knick occurs when the heat-treatment temperature x (° C.) is 410° C., while solidification and reformation can be achieved and the adverse effects caused by the fine particles can be reduced. Thus, the heat-treatment temperature x (° C.) is preferably 400° C. or lower or 390° C. or lower. The knick refers to an abrupt reduction in magnetization that occurs when the magnetic field is slightly reduced in a region of a magnetization-magnetic field curve (M-H curve) other than a region that indicates the coercive force.

When the heat-treatment temperature x (° C.) is in the range of 350 to 410° C. (the range of formula (2)), the heat-treatment temperature x (° C.) and the heat-treatment time y (hour) meet the formula (1). The formula (1) has been verified experimentally, and specifically indicates that the heat-treatment time is shorter as the heat-treatment temperature is higher in order to achieve solidification and reformation and reduce the adverse effects caused by the fine particles.

The magnetic phases in the SmFeN powder have a crystal structure of a $Th_2Zn_{17}$ type and/or a $Th_2Ni_{17}$ type, and are basically stable. However, the crystal structure discussed above may be slightly disturbed and Fe alone (α-Fe phases) is occasionally present on the surface of particles with relatively large particle diameters (particles other than the fine particles). In addition, most fine particles are formed by crushing particles with relatively large particle diameters. Therefore, the crystal structure discussed above may be disturbed in most of the fine particles, and a large amount of Fe alone (α-Fe phases) is occasionally present in the fine particles. In any case, the amount of Fe alone (α-Fe phases) that is present is limited, and formation of Fe—Zn alloy phases is saturated when the heat-treatment time y (hour) reaches 40 hours. From the viewpoint of economy, the heat-treatment time y (time) is preferably 40 hours or less, 35 hours or less, 30 hours or less, 25 hours or less, or 24 hours or less.

In order to suppress oxidation of the sintered body, the sintered body is preferably subjected to heat treatment in vacuum or an inert gas atmosphere. The inert gas atmosphere includes a nitrogen gas atmosphere. While heat treatment for the sintered body may be performed in a mold used for pressure sintering, no pressure is applied to the sintered body during heat treatment. Consequently, when the heat treatment conditions discussed above are met, normal magnetic phases are decomposed to generate α-Fe phases, and Fe and Zn are not excessively diffused in each other as a result of the generation.

A rare-earth magnet obtained by the manufacturing method according to the present disclosure that has been described so far will be described below.

Rare-Earth Magnet

The rare-earth magnet according to the present disclosure includes magnetic phases containing Sm, Fe, and N, at least a part of the magnetic phases having a crystal structure of one of a $Th_2Zn_{17}$ type and a $Th_2Ni_{17}$ type. The composition etc. of the magnetic phases is as described in "Method of Manufacturing Rare-earth Magnet".

The rare-earth magnet according to the present disclosure is obtained using mixed powder of SmFeN powder and reforming material powder containing metallic zinc. Therefore, the rare-earth magnet contains zinc components that derive from the metallic zinc in the reforming material powder. As discussed above, some particles of the SmFeN powder and some particles of the metallic zinc in the reforming material powder are diffused in each other to form Fe—Zn alloy phases. Thus, zinc that is present as the metallic zinc and zinc that is present as a constituent element of the Fe—Zn alloy phases are present in the rare-earth magnet according to the present disclosure. Therefore, the total of the zinc will be referred to as "zinc components" herein unless specifically stated otherwise. The content proportion (content) of the "zinc components" is the content proportion (content) of Zn (zinc element). The zinc components of the rare-earth magnet according to the present disclosure derive from the metallic zinc in the reforming material powder. Therefore, the reason that the content proportion of the zinc components is in the range of 10 to 30% by mass is the same as the reason that the content proportion of the metallic zinc in the reforming material powder is 10 to 30% by mass with respect to the mixed powder as described in "Method of Manufacturing Rare-earth Magnet".

The rare-earth magnet according to the present disclosure is obtained by subjecting a magnetic-field molded body of the mixed powder to pressure sintering to obtain a sintered body and further subjecting the sintered body to heat treatment under predetermined conditions. In the magnetic-field molded body, the surface of particles of the SmFeN powder with relatively large particle diameters (particles other than the fine particles) is covered with reforming phases (Fe—Zn phases) alloyed with the metallic zinc to form crystal phase particles. In addition, the fine particles of the SmFeN powder are also alloyed with the metallic zinc to form Fe—Zn phases, and most of the Fe—Zn phases that derive from the fine particles are integrated with reforming phases that cover the surface of particles with relatively large particle diameters (particles other than the fine particles). Thus, there are very few Fe—Zn phases that derive from the fine particles, that is, crystal particles having particle diameters of 1.0 μm or less. From this point of view, the proportion of the crystal phase particles having particle diameters of 1.0 μm or less is 10.00% or less, 9.08% or less, 9.00% or less, or 8.95% or less with respect to the total number of the crystal phase particles. The total number of the crystal phase particles is the total of the number of crystal phase particles that include magnetic phases covered with reforming phases and the number of crystal phase particles that include Fe—Zn phases that derive from the fine particles. The crystal phase particles may be recognized as particles through optical microscope observation, and one crystal phase particle contains one or more crystal phases. The crystal phases are magnetic phases and/or Fe—Zn phases. Thus, the crystal phase particles include crystal phase particles covered with reforming phases (Fe—Zn phases) that derive from particles of the SmFeN powder with relatively large particle diameters (particles other than the fine particles), and crystal phase particles that are Fe—Zn phases that derive from the fine particles and are not integrated with the reforming phases. That is, in the rare-earth magnet according to the present disclosure, the magnetic phases of the SmFeN powder and the zinc components in the reforming material powder form crystal phase particles, which include crystal phase particles covered with reforming phases (Fe—Zn phases) that derive from particles of the SmFeN powder with relatively large particle diameters (particles other than the fine particles), and crystal phase particles that are Fe—Zn phases that derive from the fine particles and are not integrated with the reforming phases.

The particle diameter of the crystal phase particles is measured (examined) by the following method. Herein, the indication of the particle diameter of the crystal phase particles is based on the following measurement method (examination method) unless specifically stated otherwise.

Figure 5:
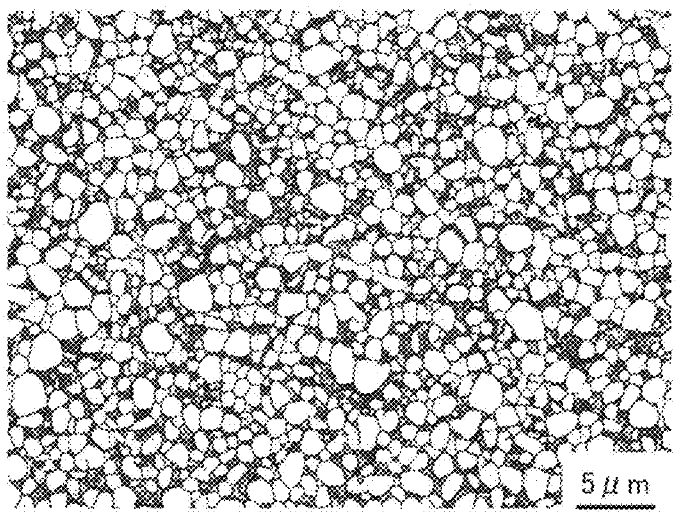
FIG. 5 illustrates an optical microscope image of a section of a sintered body after heat treatment.

A section of the sintered body after heat treatment is polished, and observed using an optical microscope. FIG. 5 illustrates an optical microscope image of the section of the sintered body after heat treatment. In FIG. 5, the bright field indicates crystal phase particles. The optical microscope image illustrated in FIG. 5 is subjected to an image analysis, and the particle diameter of the crystal phase particles is measured (examined) based on the frequency distribution with respect to the major axis of the crystal phase particles.

Modifications

Besides the description above, the rare-earth magnet and the method of manufacturing the same according to the present disclosure can be modified in various ways within the scope of the claims.

For example, a part of the fine particles in the SmFeN powder may be removed in advance before magnetic-field molding. The fine particles often cannot be removed completely, and the adverse effects caused by the fine particles that remain in the SmFeN powder after an operation to remove the fine particles can be reduced by the manufacturing method according to the present disclosure. The operation (method) to remove the fine particles is not specifically limited. The operation (method) to remove the fine particles may be a method in which a cyclone (registered trademark) classification device is used, a method in which a sieve is used, a method in which a magnetic field is used, a method in which static electricity is used, etc. These methods may be used in combination.

The rare-earth magnet and the method of manufacturing the same according to the present disclosure will be described further specifically below with reference to examples and comparative examples. The rare-earth magnet and the method of manufacturing the same according to the present disclosure are not limited to the conditions used in the following examples.

Preparation of Sample

A sample of the rare-earth magnet was prepared as follows.

EXAMPLE 1

5.0 kg of $FeSO_4.7H_2O$ was mixed and dissolved in 2.0 kg of pure water. Further, 0.49 kg of $Sm_2O_3$, 0.74 kg of 70% sulfuric acid, and 0.035 kg of $La_2O_3$ were added, and stirred well to be completely dissolved. Next, pure water was added to the obtained solution, and adjusted such that the final Fe concentration and Sm concentration were 0.726 mol/L and 0.112 mol/L, respectively, to obtain an SmFeLa sulfuric acid solution.

Precipitation Process

The whole amount of the prepared SmFe sulfuric acid solution was dropped into 20 kg of pure water kept at a temperature of 40° C. while stirring over 70 minutes since the start of the reaction, and a 15% ammonia solution was dropped at the same time to adjust to a pH of 7 to 8. Consequently, slurry containing SmFeLa hydroxide was obtained. The obtained slurry was washed with pure water through decantation, and thereafter the slurry was subjected to solid-liquid separation. The separated hydroxide was dried for 10 hours in an oven at 100° C.

Oxidation Process

The hydroxide obtained through the precipitation process was subjected to a sintering process for one hour at 1000° C. in the atmosphere. After being cooled, red SmFeLa oxide was obtained as raw material powder.

Pre-Treatment Process 100 g of the SmFeLa oxide was put into a steel container such that a thickness of the SmFeLa oxide becomes 10 mm. The container was placed in a furnace, and decompressed to 100 Pa. After that, the container was heated to a pre-treatment temperature of 850° C. while introducing a hydrogen gas, and kept as it was for 15 hours. The oxygen concentration was 5% by mass as measured by the non-dispersive infrared absorption method (ND-IR) (EMGA-820 manufactured by Horiba Ltd.). Consequently, it was found that black partial oxide in which oxygen bonded to Sm was not reduced and 95% of oxygen bonded to Fe was reduced was obtained.

Reduction Process 60 g of the partial oxide obtained through the pre-treatment process and 19.2 g of metallic calcium with an average particle diameter of about 6 mm were mixed, and put into a furnace. An argon gas (Ar gas) was introduced after the furnace was evacuated to a vacuum. The furnace was heated to a first temperature of 1090° C., kept for 45 minutes, and thereafter cooled to obtain SmFe alloy particles.

Nitriding Process

Subsequently, the furnace was evacuated to a vacuum after being cooled to a temperature of 100° C., heated to a first temperature of 430° C. while introducing a nitrogen gas, and kept for three hours. Subsequently, the furnace was heated to a second temperature of 500° C., kept for one hour, and cooled to obtain an agglomerated product containing magnetic particles.

Post-Treatment Process

The agglomerated product obtained through the nitriding process was put into 3 kg of pure water, and stirred for 30 minutes. After being left to stand, the supernatant solution was drained through decantation. The product was put into pure water, stirred, and subjected to decantation repeatedly 10 times. Then, 2.5 g of 99.9% acetic acid was added, and stirred for 15 minutes. After being left to stand, the supernatant solution was drained through decantation. The product was put into pure water, stirred, and subjected to decantation repeatedly twice.

Acid Treatment Process

A 6% aqueous solution of hydrochloric acid was added to 100 parts by mass of the powder obtained through the washing process to be equivalent to 4.3 parts by mass of hydrogen chloride, and stirred for one minute. After being left to stand, the supernatant solution was drained through decantation. The product was put into pure water, stirred, and subjected to decantation repeatedly twice. After being subjected to solid-liquid separation, the product was dried in a vacuum at 80° C. for three hours to obtain SmFeN powder with a composition of $Sm_{92}Fe_{77.1}N_{13.59}La_{0.11}$.

The obtained SmFeN powder was packed into a sample container together with paraffin wax, and easily magnetized magnetic domains were aligned in an oriented magnetic field of 16 kA/m after the paraffin was melted using a drier. The sample that had been subjected to magnetic field orientation was subjected to pulsed magnetization in a magnetizing magnetic field of 32 kA/m. When the magnetic properties of the sample were measured at room temperature using a vibrating sample magnetometer (VSM) with a maximum magnetic field of 16 kA/m, the remanent magnetization was 1.44 T, and the coercive force was 750 kA/m.

When the particle size distribution of the obtained SmFeN powder was examined by the method discussed above, the result was as indicated in FIG. 6. In addition, Table 1 indicates the $D_{50}$ of the SmFeN powder and the proportion of particles having particle diameters of 1.0 μm or less. The proportion of particles having particle diameters of 1.0 μm or less is the proportion (%) of such particles to all the particles of the SmFeN powder. In Table 1, the proportion of particles having particle diameters of 1.0 μm or less is abbreviated as "Proportion (%) of 1.0 μm or less".

Metallic zinc powder was prepared as reforming material powder. The $D_{50}$ of the metallic zinc powder was 0.5 μm. In addition, the purity of the metallic zinc powder was 99.9% by mass.

The SmFeN powder and the reforming material powder were mixed to obtain mixed powder. The amount of the metallic zinc mixed in the whole mixed powder was as indicated in Table 1.

The mixed powder was subjected to compression molding in a magnetic field to obtain a magnetic-field molded body. The pressure for the compression molding was 50 MPa. The applied magnetic field was 1600 kA/m.

The magnetic-field molded body was subjected to pressure sintering under the conditions indicated in Table 1 to obtain a sintered body. Then, the sintered body was subjected to heat treatment under the conditions indicated in Table 1. The sintered body after the heat treatment was determined as the sample according to Example 1.

EXAMPLES 2 TO 6 AND COMPARATIVE EXAMPLES 1 TO 6

Samples were prepared in the same manner as in Example 1 except that the amount of the reforming material powder compounded and the heat treatment conditions were as indicated in Table 1.

Evaluations

The magnetic properties were measured and the particle diameter distribution of magnetic phases was examined for each sample (sintered body after the heat treatment). The magnetic properties were measured at room temperature using a vibrating sample magnetometer (VSM). The particle diameter distribution of magnetic phases was examined by the method discussed above.

The evaluation results are indicated in Table 1. In Table 1, "Magnetization at −1600 kA/m" in the "Magnetic properties" field means "magnetization in external magnetic field of −1600 kA/m", and "Proportion (%) of 1.0 μm or less" in the "Sintered body after heat treatment" field means "proportion (%) of magnetic phases having particle diameters of 1.0 μm or less".

The magnetic properties of a green compact of the mixed powder are indicated in Table 1 as Reference Example 1. As indicated in Table 1, the $D_{50}$ of the SmFeN powder, the amount of the reforming material powder compounded, and the magnetic-field molding conditions for Reference Example 1 are different from those for Example 1. Since the pressure sintering temperature is 23° C. as indicated in Table 1, the green compact was actually not sintered or subjected to heat treatment. That is, the magnetic properties of the green compact according to Reference Example 1 may be considered as the magnetic properties of the mixed powder. The green compact has a negative value in "Magnetization at −1600 kA/m" in the "Magnetic properties" field, because the green compact was not heated and therefore not reformed at all, and had a small coercive force and therefore had a negative magnetization value in an external magnetic field of −1600 kA/m.

Figure 6:
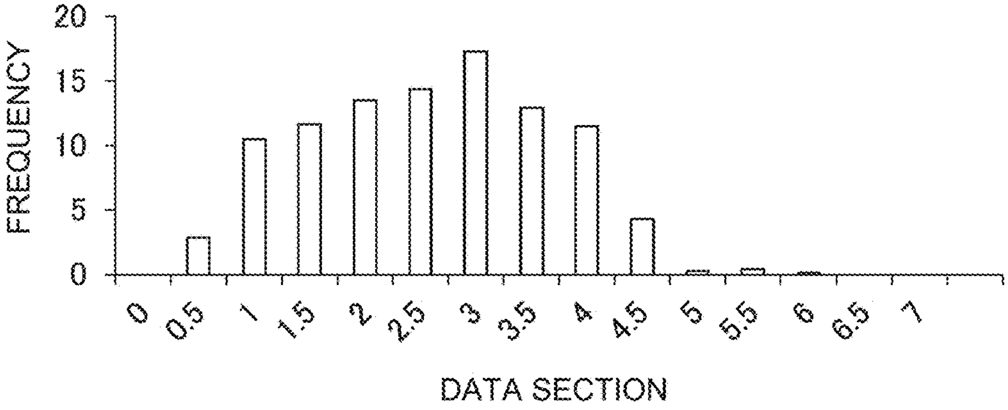
FIG. 6 is a graph illustrating particle size distribution of SmFeN powder that was used to prepare samples according to Examples 1 to 6 and Comparative Examples 1 to 6.
Figure 7:
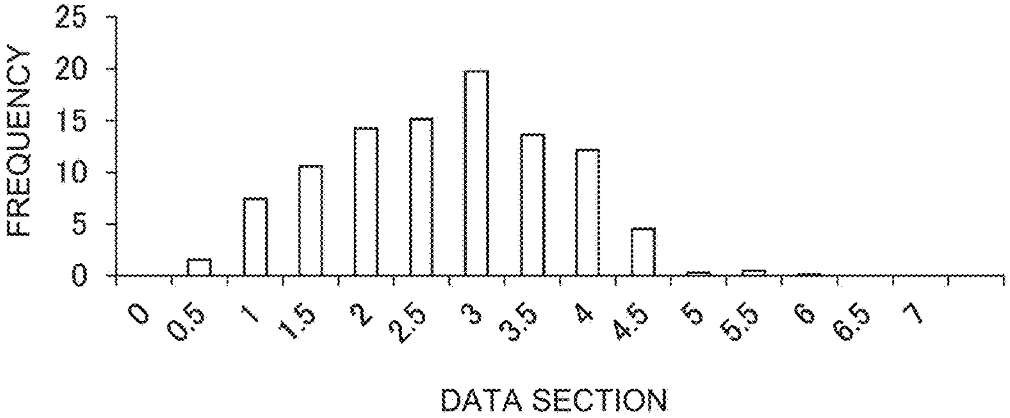
FIG. 7 is a graph illustrating a result of examining particle diameter distribution of crystal phase particles for a sample (sintered body after heat treatment) according to Example 1.
Figure 8:
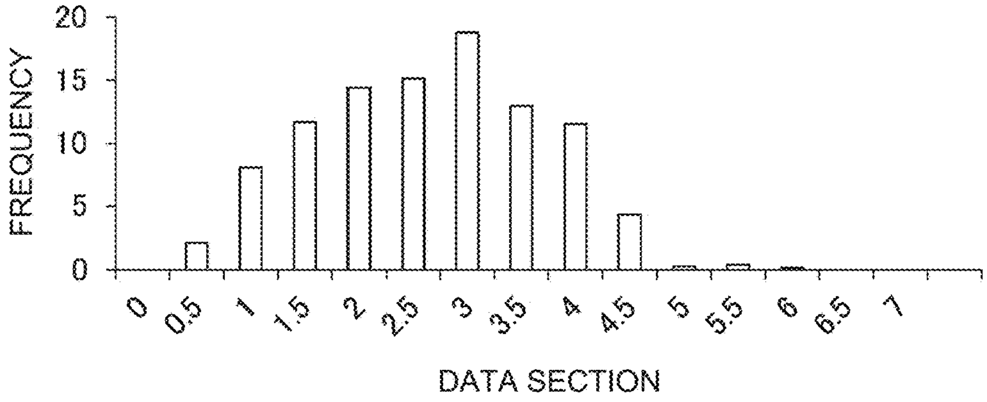
FIG. 8 is a graph illustrating a result of examining particle diameter distribution of crystal phase particles for a sample (sintered body after heat treatment) according to Comparative Example 1.
Figure 9:
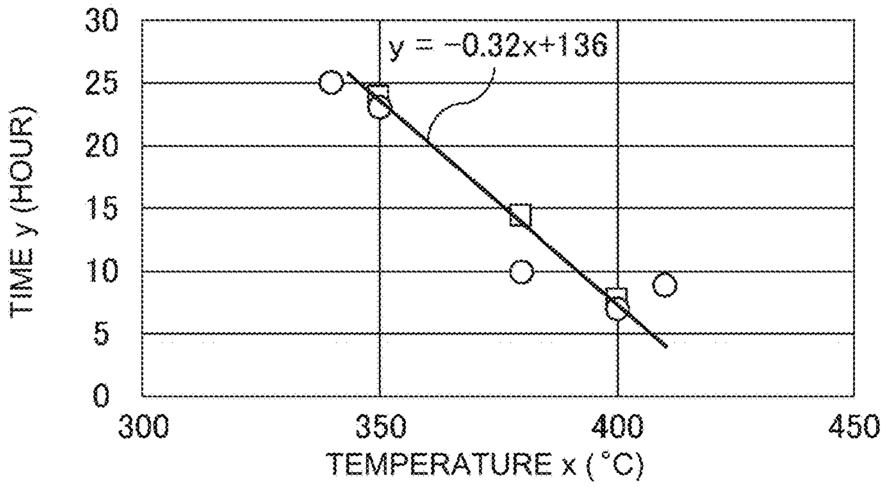
FIG. 9 is a graph illustrating a relationship between a heat-treatment temperature and heat-treatment time for a sample in which 10% by mass of reforming material powder was compounded.
Figure 10:
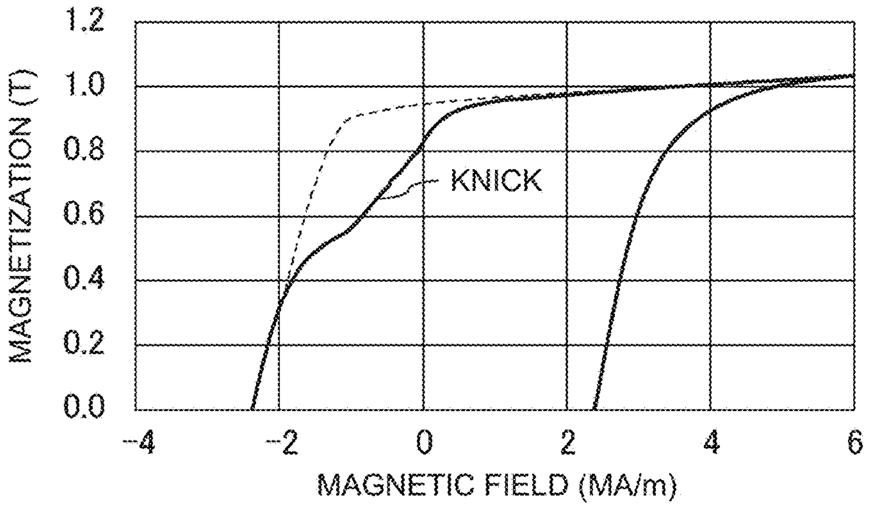
FIG. 10 is a graph illustrating a part of the magnetization-magnetic field curves (M-H curves) for a sample according to Example 6.
Figure 11:
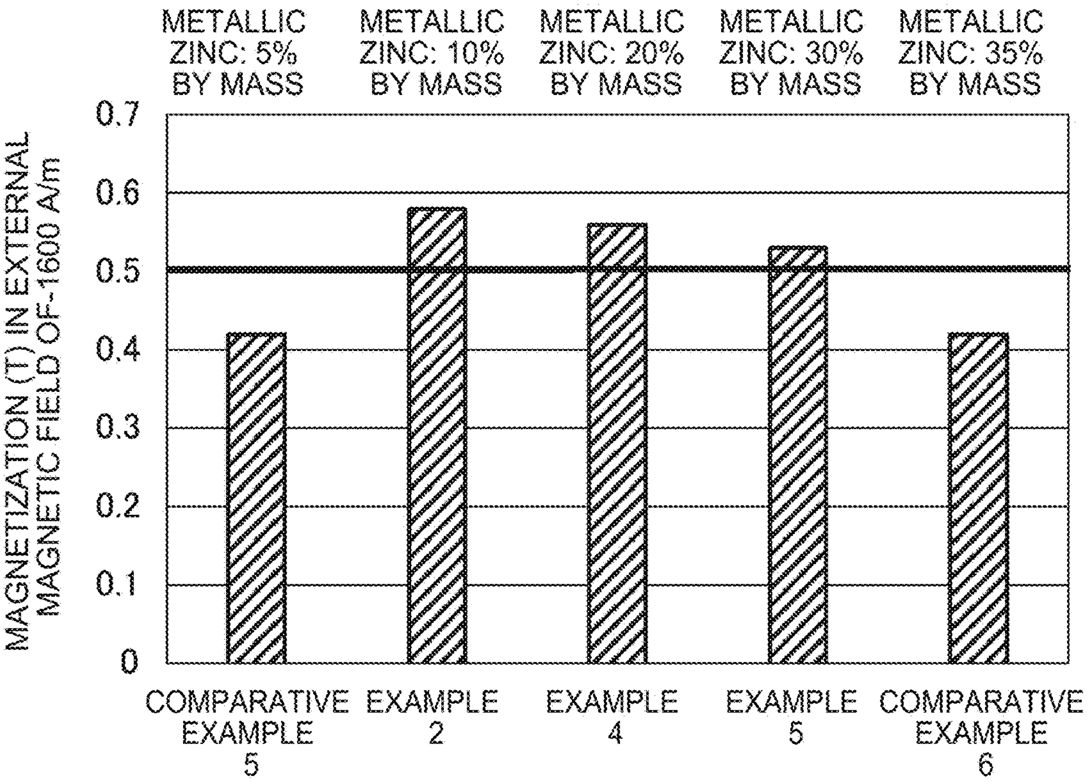
FIG. 11 is a graph illustrating a relationship between the amount of reforming material powder compounded and magnetization in an external magnetic field of −1600 kA/m.
Figure 12:
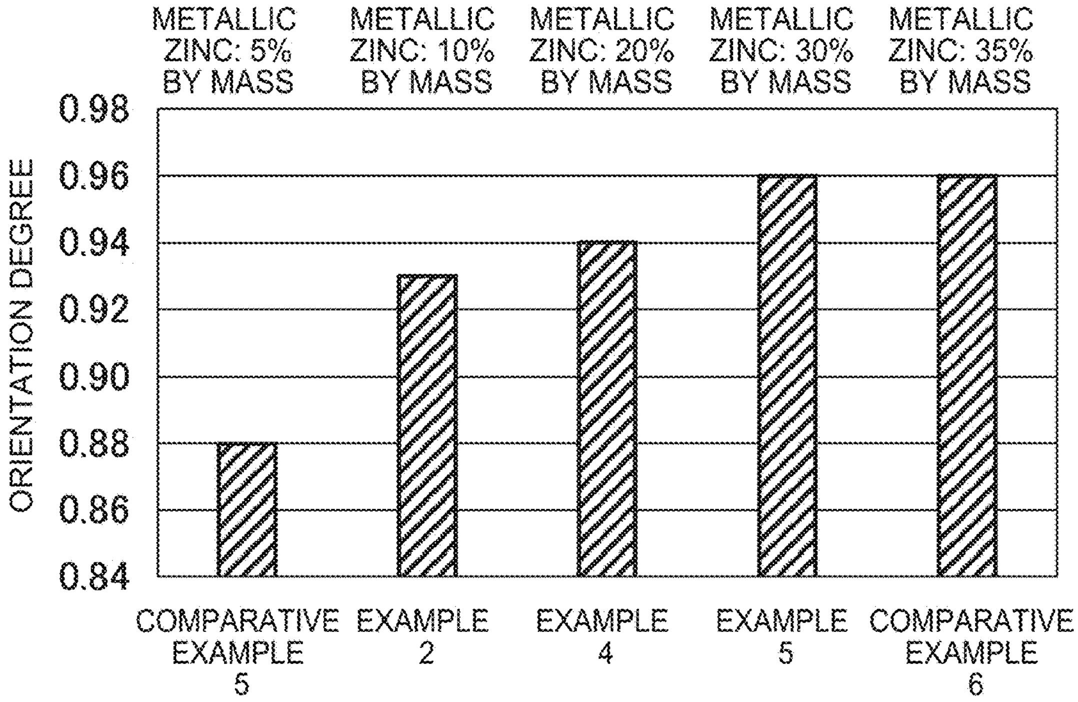
FIG. 12 is a graph illustrating a relationship between the amount of reforming material powder compounded and an orientation degree.

FIG. 6 is a graph illustrating the particle size distribution of SmFeN powder that was used to prepare samples according to Examples 1 to 6 and Comparative Examples 1 to 6. FIG. 7 is a graph illustrating a result of examining the particle diameter distribution of crystal phase particles for a sample (sintered body after heat treatment) according to Example 1. FIG. 8 is a graph illustrating a result of examining the particle diameter distribution of crystal phase particles for a sample (sintered body after heat treatment) according to Comparative Example 1. FIG. 9 is a graph illustrating a relationship between a temperature and time for a sample in which 10% by mass of reforming material powder was compounded. FIG. 10 is a graph illustrating a part of the magnetization-magnetic field curves (M-H curves) for a sample according to Example 6. FIG. 11 is a graph illustrating a relationship between the amount of reforming material powder compounded and magnetization in an external magnetic field of −1600 kA/m. FIG. 12 is a graph illustrating a relationship between the amount of reforming material powder compounded and an orientation degree. In the "data sections" in FIGS. 6 to 8, "0" means "more than 0 μm and 0.5 μm or less", "0.5" means "more than 0.5 μm and 1.0 μm or less", "1" means "more than 1.0 μm and 1.5 μm or less" (the same applies hereafter).

TABLE 1

| | SmFeN powder D$_{50}$ (µm) | SmFeN powder Proportion of 1.0 µm or less (%) | Reforming material powder Amount of metallic zinc compounded (% by mass) | Magnetic-field molding Applied magnetic field (kA/m) | Magnetic-field molding Pressure (MPa) | Pressure sintering Temperature (° C.) | Pressure sintering Pressure (MPa) | Pressure sintering Time (min.) | Heat treatment Atomsphere | Heat treatment Temperature (° C.) |
|---|---|---|---|---|---|---|---|---|---|---|
| Ex. 1 | 3.08 | 13.4 | 10 | 1600 | 50 | 380 | 1500 | 5 | Vacuum | 400 |
| Ex. 2 | 3.08 | 13.4 | 10 | 1600 | 50 | 380 | 1500 | 5 | Vacuum | 380 |
| Ex. 3 | 3.08 | 13.4 | 10 | 1600 | 50 | 380 | 1500 | 5 | Vacuum | 350 |
| Ex. 4 | 3.08 | 13.4 | 20 | 1600 | 50 | 380 | 1500 | 5 | Vacuum | 380 |
| Ex. 5 | 3.08 | 13.4 | 30 | 1600 | 50 | 380 | 1500 | 5 | Vacuum | 380 |
| Ex. 6 | 3.08 | 13.4 | 10 | 1600 | 50 | 380 | 1500 | 5 | Vacuum | 410 |
| Comp. Ex. 1 | 3.08 | 13.4 | 10 | 1600 | 50 | 380 | 1500 | 5 | Vacuum | 400 |
| Comp. Ex. 2 | 3.08 | 13.4 | 10 | 1600 | 50 | 380 | 1500 | 5 | Vacuum | 380 |
| Comp. Ex. 3 | 3.08 | 13.4 | 10 | 1600 | 50 | 380 | 1500 | 5 | Vacuum | 350 |
| Comp. Ex. 4 | 3.08 | 13.4 | 10 | 1600 | 50 | 380 | 1500 | 5 | Vacuum | 340 |
| Comp. Ex. 5 | 3.08 | 13.4 | 5 | 1600 | 50 | 380 | 1500 | 5 | Vacuum | 380 |
| Comp. Ex. 6 | 3.08 | 13.4 | 35 | 1600 | 50 | 380 | 1500 | 5 | Vacuum | 380 |
| Ref. Ex. 1 | 3.16 | — | 5 | 800 | 50 | 23 | 1800 | 1 | — | — |

| | Heat treatment Time (hr.) | Heat treatment −0.32x + 136 | Magnetic properties Orientation degree | Magnetic properties Magnetization at −1600 kA/m (T) | Magnetic properties Remanent magnetization (T) | Magnetic properties Coercive force (kA/m) | Sintered body after heat treatment Proportion of 1.0 µm or less (%) | Remarks |
|---|---|---|---|---|---|---|---|---|
| Ex. 1 | 8.0 | 8.0 | 0.94 | 0.53 | 0.85 | 2240.6 | 8.95 | — |
| Ex. 2 | 14.4 | 14.4 | 0.93 | 0.58 | 0.95 | 2098.6 | 9.08 | — |
| Ex. 3 | 24.0 | 24.0 | 0.92 | 0.52 | 0.96 | 2101.3 | 9.56 | — |
| Ex. 4 | 14.4 | 14.4 | 0.94 | 0.56 | 0.81 | 2235.1 | 7.15 | — |
| Ex. 5 | 14.4 | 14.4 | 0.96 | 0.53 | 0.67 | 2494.4 | 8.95 | — |
| Ex. 6 | 9.0 | 4.8 | 0.95 | 0.47 | 0.81 | 2356.4 | 8.87 | Knick occurred |
| Comp. Ex. 1 | 7.0 | 8.0 | 0.89 | 0.48 | 0.86 | 2201.6 | 10.24 | — |
| Comp. Ex. 2 | 10.0 | 14.4 | 0.88 | 0.49 | 0.97 | 2050.1 | 10.51 | — |
| Comp. Ex. 3 | 23.0 | 24.0 | 0.90 | 0.45 | 0.96 | 2095.5 | 10.05 | — |
| Comp. Ex. 4 | 25.0 | 27.2 | 0.90 | 0.46 | 0.95 | 2070.3 | 10.04 | — |
| Comp. Ex. 5 | 14.4 | 14.4 | 0.88 | 0.42 | 0.90 | 1943.8 | 11.03 | — |
| Comp. Ex. 6 | 14.4 | 14.4 | 0.96 | 0.42 | 0.53 | 2504.6 | 8.72 | — |
| Ref. Ex. 1 | — | — | 0.91 | −0.42 | 1.02 | 936.2 | — | — |

It can be understood from Table 1 that the proportion of fine crystal phases having particle diameters of 1.0 µm or less is low and the orientation degree is high for all the samples according to Examples 1 to 6. In addition, it can be understood from Table 1 and FIG. 12 that it is necessary to compound metallic zinc at a predetermined content proportion or more in order to improve the orientation degree.

As seen from Table 1, the same SmFeN powder is used to prepare the samples according to Examples 1 to 6 and Comparative Examples 1 to 6. As indicated in Table 1 and FIG. 6, the SmFeN powder contains a relatively large quantity of fine particles (particles having particle diameters of 1.0 µm or less). However, it can be understood that in Examples 1 to 6, as indicated in Table 1 and FIG. 7, the proportion of fine crystal phases having particle diameters of 1.0 µm or less that derive from the fine particles is low. On the contrary, it can be understood that in Comparative Examples 1 to 5, as indicated in Table 1 and FIG. 8, a large quantity of fine crystal phases having particle diameters of 1.0 µm or less that derive from the fine particles remain.

It can be understood from Table 1 and FIG. 11 that when the amount of metallic zinc compounded is excessive (Comparative Example 6), magnetization in an external magnetic field of −1600 kA/m is reduced although the orientation degree is good. Thus, it can be understood that it is necessary that the proportion of metallic zinc compounded should be a predetermined value or less in order to suppress a reduction in magnetization due to the use of the reforming material powder.

It can be understood from Table 1 and FIG. 9 that when the temperature x and the time y for heat treatment meet the formulas (1) and (2) given above, fine crystal phases are present at a predetermined proportion or less, which makes it possible to obtain a rare-earth magnet with an improved orientation degree while suppressing a reduction in magnetization due to the use of the reforming material powder.

As seen in Table 1 and FIG. 10, a knick occurs when the temperature x (° C.) for heat treatment is close to the upper limit (Example 6), and the magnetization is reduced locally in a region in which the absolute value of the external magnetic field of the demagnetization curve (the third quadrant of the magnetization-magnetic field curve) is small. It can be understood from Table 1 and FIG. 9 that the effects of the present disclosure can be obtained further clearly when the temperature x (° C.) for heat treatment is 400° C. or lower.

The effects of the rare-earth magnet and the method of manufacturing the same according to the present disclosure can be confirmed from the above results.

What is claimed is:

1. A method of manufacturing a rare-earth magnet, comprising:

preparing magnetic powder including magnetic phases containing Sm, Fe, and N, at least a part of the magnetic phases having a crystal structure of one of a $Th_2Zn_{17}$ type and a $Th_2Ni_{17}$ type;

preparing reforming material powder containing metallic zinc;

mixing the magnetic powder and the reforming material powder to obtain mixed powder;

subjecting the mixed powder to compression molding in a magnetic field to obtain a magnetic-field molded body;

subjecting the magnetic-field molded body to pressure sintering to obtain a sintered body; and subjecting the sintered body to heat treatment, wherein:

a content proportion of the metallic zinc in the reforming material powder is greater than 20% by mass and is equal to or less than 30% by mass with respect to the mixed powder; and when a temperature and time in conditions for the heat treatment are defined as x° C. and y hours, respectively, the following formulas are met:

$$y \geq -0.32x+136$$

$$350 \leq x \leq 410, \text{ and}$$

$$y \geq 14.4.$$

2. The method according to claim 1, wherein x meets 350≤x≤400.

3. The method according to claim 1, wherein y meets y≤40.

4. The method according to claim 1, wherein the magnetic-field molded body is subjected to pressure sintering for one to 30 minutes at pressures of 1000 to 1500 MPa and at temperatures of 300 to 400° C.

5. The method according to claim 1, wherein a proportion of magnetic particles having particle diameters of 1.0 μm or less in the magnetic powder is 1 to 20% with respect to all the magnetic particles in the magnetic powder.

6. The method according to claim 1, wherein the rare-earth magnet has an orientation degree of 0.92 or higher and a magnetization in an external magnetic field of −1600 kA/m of no lower than 0.47.

7. The method according to claim 1, wherein a proportion of magnetic phases having particle diameters of 1.0 μm or less in the sintered body after heat treatment is 9.56% or less.

8. A method of manufacturing a rare-earth magnet, comprising:

preparing magnetic powder including magnetic phases containing Sm, Fe, and N, at least a part of the magnetic phases having a crystal structure of one of a $Th_2Zn_{17}$ type and a $Th_2Ni_{17}$ type;

preparing reforming material powder containing metallic zinc;

mixing the magnetic powder and the reforming material powder to obtain mixed powder;

subjecting the mixed powder to compression molding in a magnetic field to obtain a magnetic-field molded body;

subjecting the magnetic-field molded body to pressure sintering to obtain a sintered body; and subjecting the sintered body to heat treatment, wherein:

a content proportion of the metallic zinc in the reforming material powder is greater than 20% by mass and is equal to or less than 30% by mass with respect to the mixed powder; and when a temperature and time in conditions for the heat treatment are defined as x° C. and y hours, respectively, the following formulas are met:

$$y \geq -0.32x+136$$

$$350 \leq x \leq 410, \text{ and}$$

$$y \geq 14.4,$$

wherein the rare-earth magnet has an orientation degree of 0.92 or higher and a magnetization in an external magnetic field of −1600 kA/m of no lower than 0.47.

* * * * *